(12) United States Patent
Ferdi et al.

(10) Patent No.: US 11,968,533 B2
(45) Date of Patent: Apr. 23, 2024

(54) METHODS AND APPARATUS FOR SECURE ACCESS CONTROL IN WIRELESS COMMUNICATIONS

(71) Applicant: InterDigital Patent Holdings, Inc., Wilmington, DE (US)

(72) Inventors: Samir Ferdi, Kirkland (CA); Alec Brusilovsky, Downingtown, PA (US); Guanzhou Wang, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 247 days.

(21) Appl. No.: 17/440,574

(22) PCT Filed: Mar. 27, 2020

(86) PCT No.: PCT/US2020/025440
§ 371 (c)(1),
(2) Date: Sep. 17, 2021

(87) PCT Pub. No.: WO2020/205609
PCT Pub. Date: Oct. 8, 2020

(65) Prior Publication Data
US 2022/0201482 A1 Jun. 23, 2022

Related U.S. Application Data

(60) Provisional application No. 62/861,773, filed on Jun. 14, 2019, provisional application No. 62/839,553, (Continued)

(51) Int. Cl.
*H04L 29/06* (2006.01)
*H04W 12/08* (2021.01)
(Continued)

(52) U.S. Cl.
CPC ......... *H04W 12/08* (2013.01); *H04W 12/106* (2021.01); *H04W 60/00* (2013.01)

(58) Field of Classification Search
CPC ... H04W 12/08; H04W 12/106; H04W 60/00; H04W 12/037; H04L 9/0841;
(Continued)

(56) References Cited

U.S. PATENT DOCUMENTS

2009/0262684 A1 10/2009 Khetawat et al.
2014/0331052 A1 11/2014 Suffling
(Continued)

FOREIGN PATENT DOCUMENTS

CN 110536293 A 12/2019
CN 110536331 A 12/2019
(Continued)

OTHER PUBLICATIONS

3GPP S2-1902898, "Introducing Support for Non-Public Networks," Mar. 2019.
(Continued)

*Primary Examiner* — Brandon Hoffman
*Assistant Examiner* — William A Corum, Jr.
(74) *Attorney, Agent, or Firm* — Jerome G Schaefer

(57) ABSTRACT

Method and apparatus for secure access control in wireless communications are disclosed. In an example, a method includes receiving a broadcast message including system information, identifying a first set of hashed identifiers (IDs) and a first random number based on the system information, and each ID of the first set of hashed IDs is individually hashed using at least the first random number. The method also includes calculating a first hash value for each ID of a second set of IDs using at least the first random number, determining whether at least a hashed ID of the second set of IDs matches a hashed ID of the first set of hashed IDs, and
(Continued)

sending a request message based on a determination that at least a hashed ID of the second set of IDs matches a hashed ID of the first set of hashed IDs.

20 Claims, 12 Drawing Sheets

Related U.S. Application Data filed on Apr. 26, 2019, provisional application No. 62/826,926, filed on Mar. 29, 2019.

(51) Int. Cl.
*H04W 12/106* (2021.01)
*H04W 60/00* (2009.01)

(58) Field of Classification Search
CPC . H04L 9/0891; H04L 2209/80; H04L 9/3236; H04L 63/126; H04L 63/123
See application file for complete search history.

(56) References Cited

U.S. PATENT DOCUMENTS

| | | | |
|---|---|---|---|
| 2015/0009878 | A1 | 1/2015 | Kim et al. |
| 2015/0156722 | A1 | 6/2015 | Kim et al. |
| 2015/0264666 | A1 | 9/2015 | et al. |
| 2020/0275279 | A1* | 8/2020 | Tangudu ............. H04W 12/068 |
| 2020/0314701 | A1* | 10/2020 | Talebi Fard .......... H04W 36/08 |
| 2021/0400448 | A1* | 12/2021 | Adjakple ................ H04W 4/40 |
| 2022/0007274 | A1* | 1/2022 | Jin ......................... H04W 48/10 |
| 2022/0124579 | A1* | 4/2022 | Han .................. H04W 36/0058 |
| 2022/0132626 | A1* | 4/2022 | Xu ........................ H04W 76/11 |
| 2023/0021988 | A1* | 1/2023 | Park ..................... H04W 48/08 |

FOREIGN PATENT DOCUMENTS

| | | | |
|---|---|---|---|
| JP | 2015508628 | A | 3/2015 |
| JP | 2015516121 | A | 6/2015 |

OTHER PUBLICATIONS

3GPP TS 23.122, "NAS functions related to MS in idle mode," V16.0.0, 2018.
3GPP TR 33.813, "Study on Security Aspects of Enhanced Network Slicing", V0.4.0, 2019.
3GPP TS 23.502 version of ETSI TS 123 502 , "Procedures for the 5G System", V15.4.1, 2019.
3GPP TS 23.501, "System Architecture for the 5G System", V15.4.0, 2018.
Whitfield Diffie and Martin E. Hellman, "New directions in cryptography", IEEE Transactions on Information Theory, 22(6):644-654, 1976.
3GPP TS 33.501, "Security architecture and procedures for 5G system", v15.2.0, 2018.
3GPP TR 33.819, "Study on security for 5GS enhanced support of Vertical and LAN Services," V0.2.0, 2019.
3GPP S3-190995, "New solution of CAG access control in Non-standalone NPNs," 2019.
3GPP TS 38.300, "NR; NR and NG-RAN Overall Description", Stage 2 (Release 15) V15.4.0, 2018.
3GPP TR 33.846, "Study on authentication enhancements in the 5G System," V0.1.0 2019.
IETF RFC 7748, "Elliptic Curves for Security," A. Langley, M. Hamburg, and S. Turner, 2016, Internet Research Task Force (IRTF).
3GPP S2-1902810, "TS 23.502: Introducing Non-public network—CAG," 3GPP TSG-SA WG2 Meeting #131, 2019, Tenerife, Spain.
3GPP S3-190994, "Key issue on CAG access control in Non-standalone NPNs," 2019.
S3-190861, Revision of S3-19abcd, "New Solution for CAG access control in Non-Standalone NPNs", 3GPP TSG SA WG3 (Security) Meeting #94-Ad Hoc, Mar. 11-15, 2019, Kista, Stockholm (Sweden), 3 pages.
S2-1903423, "Change Request", 23.501, v. 16.0.1 3GPP TSG-SA WG2 Meeting #132, Apr. 8- Apr. 12, 2019, Xi'an, China, 7 pages.
S2-1904667, "Change Request", 23.501, v. 16.0.1 3GPP TSG-SA WG2 Meeting #132, Apr. 8- Apr. 12, 2019, Xi'an, China, 7 pages.

* cited by examiner

METHODS AND APPARATUS FOR SECURE ACCESS CONTROL IN WIRELESS COMMUNICATIONS

CROSS-REFERENCE TO RELATED APPLICATIONS

This application is a U.S. National Stage Application under 35 U.S.C. § 371 of International Application PCT/US2020/025440, filed Mar. 27, 2020, which claims the benefit of U.S. Provisional Application No. 62/826,926 filed in the U.S. Patent and Trademark Office on Mar. 29, 2019, U.S. Provisional Application No. 62/839,553 filed in the U.S. Patent and Trademark Office on Apr. 26, 2019, and U.S. Provisional Application No. 62/861,773 filed in the U.S. Patent and Trademark Office on Jun. 14, 2019, the entire contents of each of which being incorporated herein by reference in their entirety.

SUMMARY

Embodiments disclosed herein generally relate to methods and apparatus for secure access control in wireless communications, for example, secure access control for a next-generation radio access network (NG-RAN) that is part of 5G new radio (NR) system.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Representative Communications Network

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
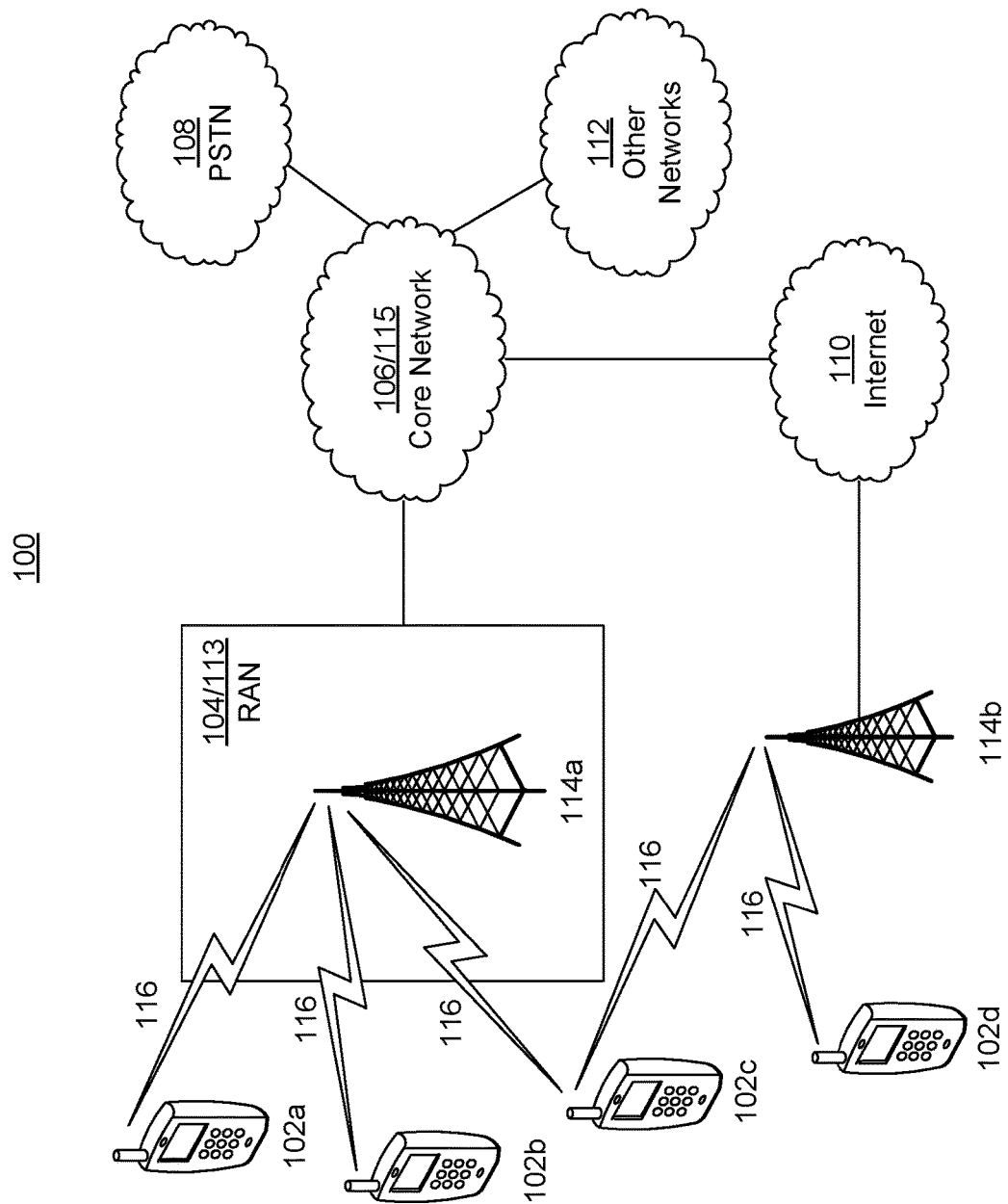
FIG. 1A is a system diagram of an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
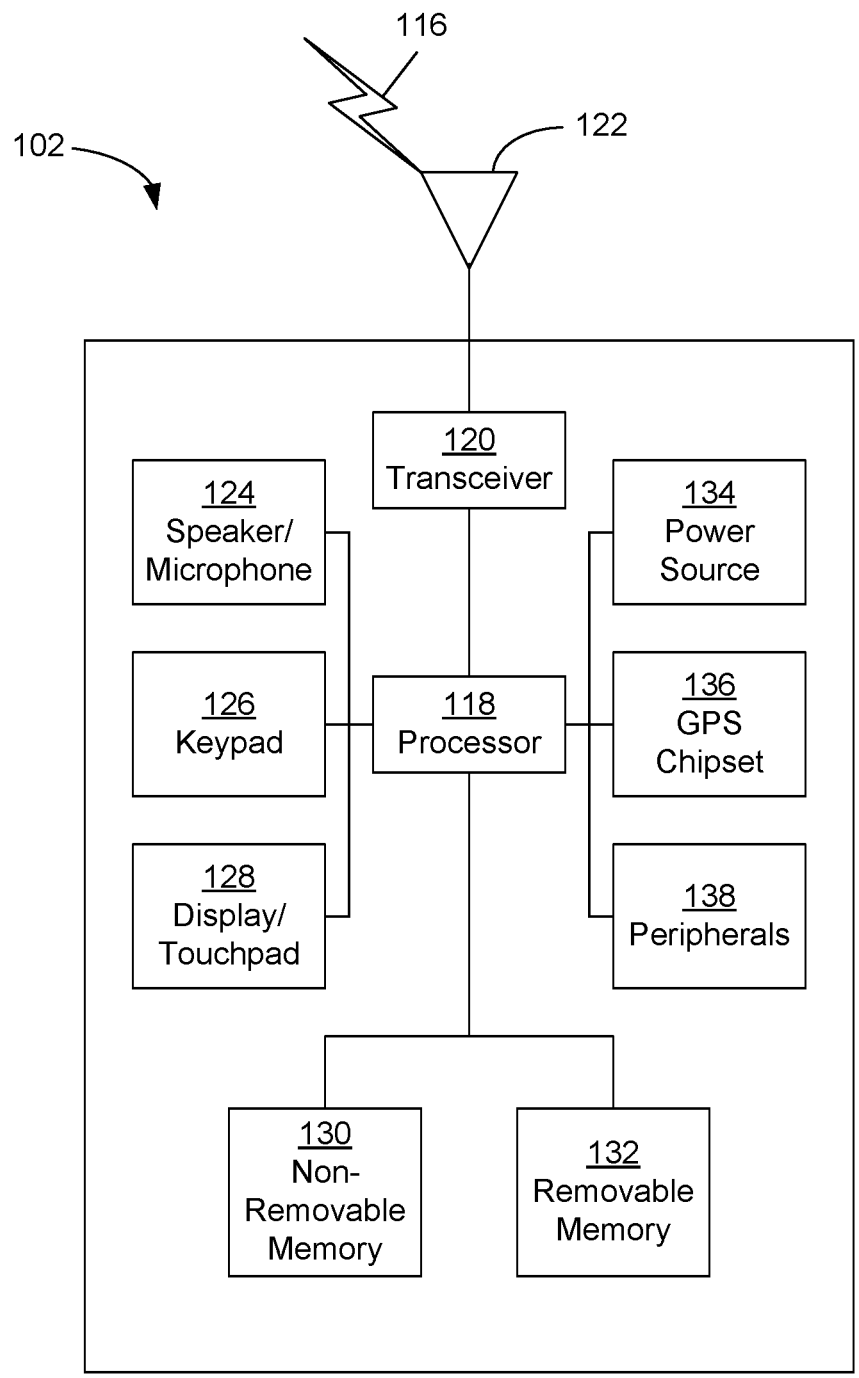
FIG. 1B is a system diagram of an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
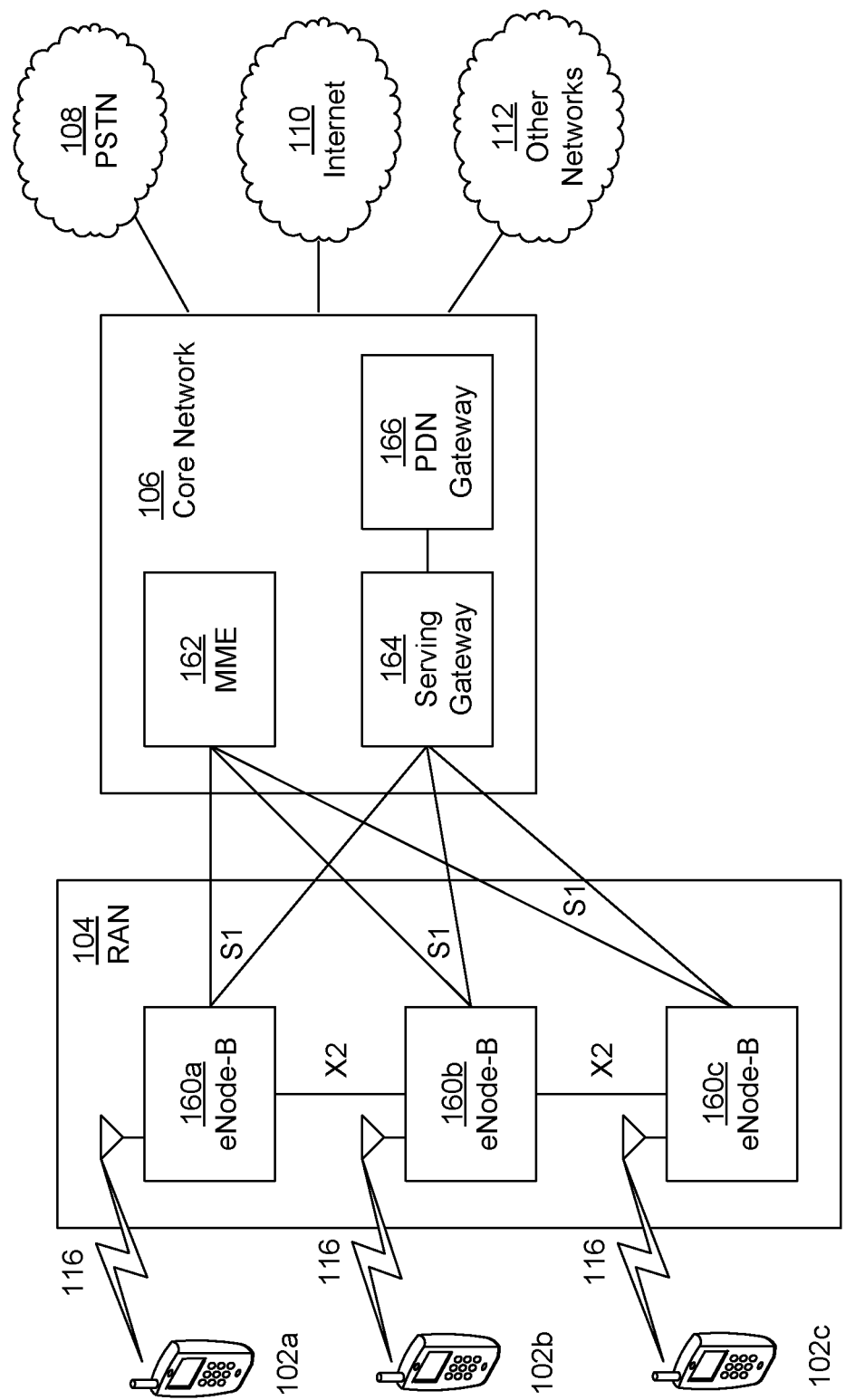
FIG. 1C is a system diagram of an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the medium access control layer.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
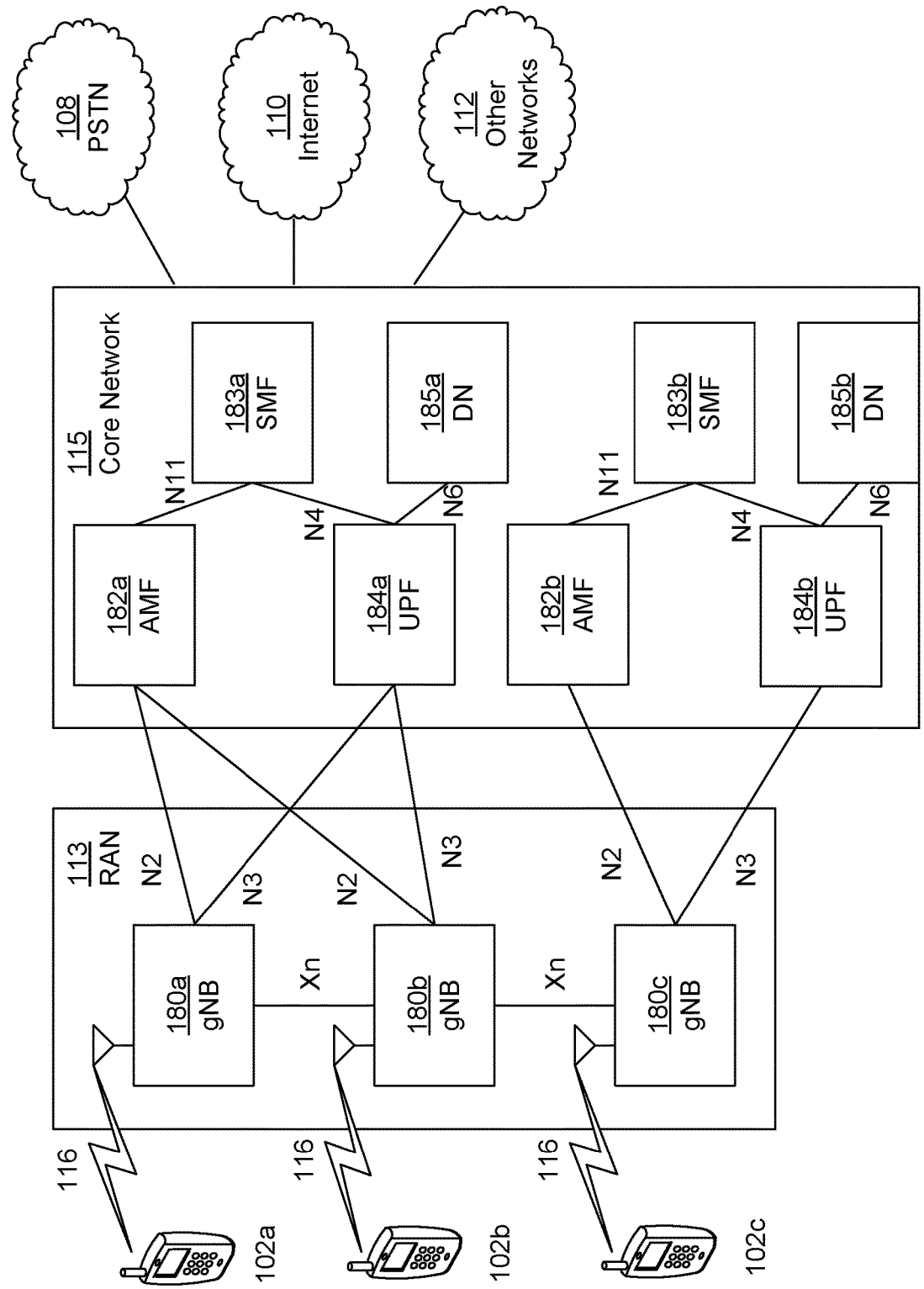
FIG. 1D is a system diagram of a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU (or UE) IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

One or more embodiments disclosed herein are related to methods and apparatus for Public Land Mobile Network (PLMN) Integrated Non-Public Networks (NPNs). In various embodiments, an NPN (e.g., a PLMN integrated NPN) may use one or more Closed Access Groups (CAGs) for identification, cell selection, and/or access control. In various embodiments, it is contemplated that other types of NPNs may be equally possible to use one or more procedures, mechanism, or embodiments discussed herein. For example, a Standalone NPN (SNPN) may use a set/list of NPN ID(s) for identification, cell selection, and/or access control, and may use one or more procedures, mechanism, or embodiments disclosed herein.

In various embodiments, the term "random number" disclosed herein may refer to a pseudo-random number, a quasi-random number or any other type of random number.
Representative Procedures for PLMN Integrated NPN Access In some implementations (e.g., in 3GPP), NPNs are supported or deployed. NPNs may be deployed or implemented with the support of one or more PLMNs using Closed Access Groups (CAGs) and/or network slicing, and in some examples, this type of NPNs may be referred to PLMN integrated NPNs. In some cases, PLMN integrated NPNs may be part of Non-Standalone (NSA) communications networks, or implemented as one or more NSA communications networks. In some cases, an NPN may be implemented as a Standalone NPN (SNPN). In an example, SNPNs may be private networks that do not rely on network functions of a Public PLMN.

In various embodiments, a CAG may be used to enable a network to prevent a WTRU from trying to access a network slice. In an example, the network slice may be dedicated to an NPN, and the NPN may be in an area where a WTRU is not allowed to use the network slice.

Figure 2:
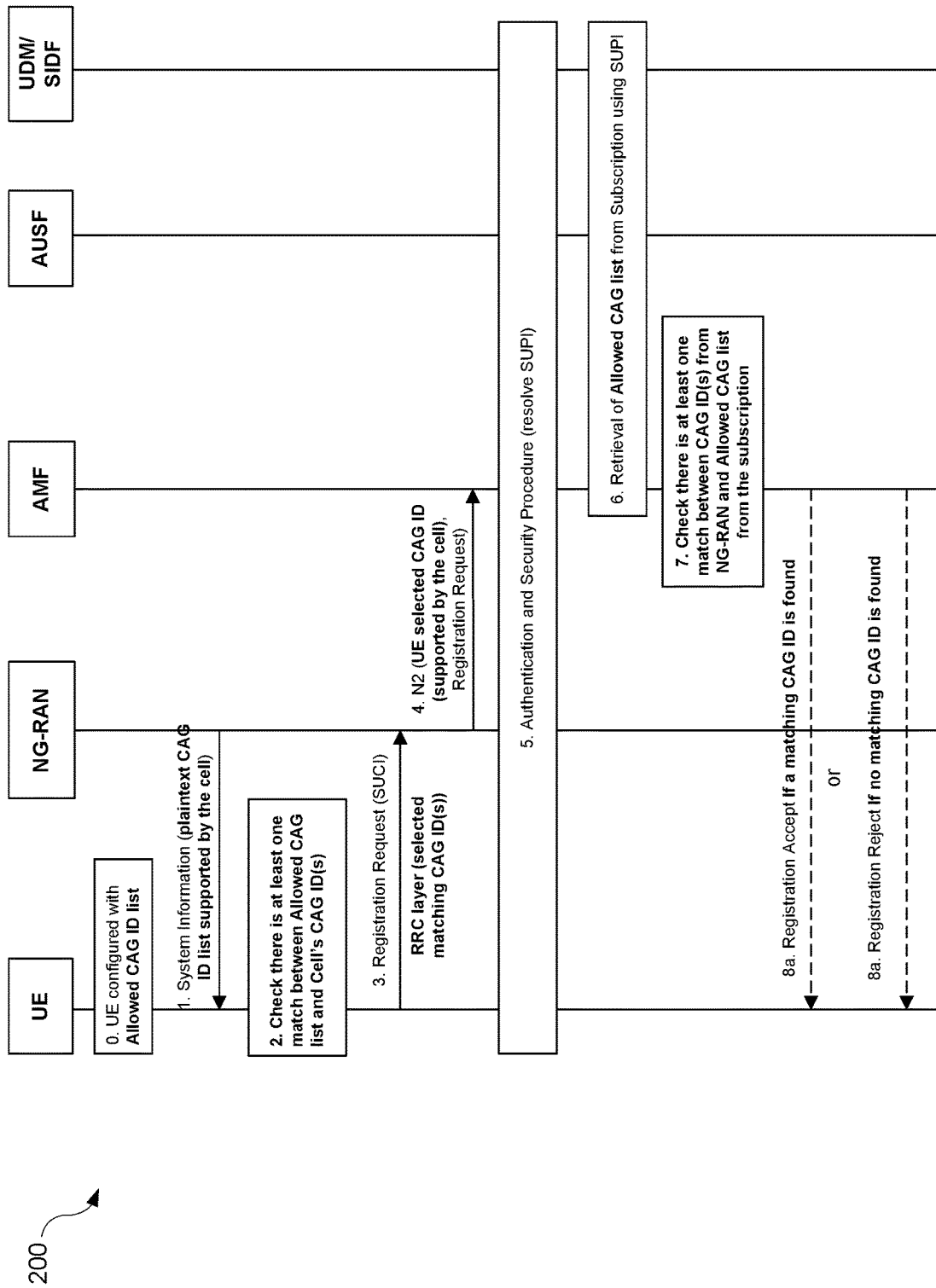
FIG. 2 is a signal flow diagram of an example of a registration procedure having closed access group (CAG) access control, according to one or more embodiments.

Referring to FIG. 2, an example of a procedure 200 for network and cell selection and access control is provided. In this example, before trying to access a CAG cell, a WTRU may compare an allowed CAG list from a local configuration of the WTRU against a set of CAG IDs that is broadcasted as plaintext by a CAG cell (e.g., Operations 0-2 as shown in FIG. 2). If the WTRU finds at least a matching CAG ID, the WTRU may proceed with a registration procedure using a subscription concealed identifier (SUCI) of the WTRU or associated with the WTRU. For example, the WTRU may send a Registration Request (e.g., with an SUCI) message to a NG-RAN and/or an Access and Mobility Management Function (AMF). In various embodiments, the WTRU may select a matching CAG ID, and may include the selected CAG ID in RRC layer signaling (e.g., in an UL RRC message). The WTRU may go through a full primary authentication so that the AMF may obtain CAG related subscription information from the Unified Data Management (UDM). The AMF may determine or verify whether at least a CAG ID from the WTRU subscription corresponds to or matches cell-supported CAG ID(s) and/or CAG ID(s) selected by the WTRU. For example, the AMF may determine or verify whether at least a CAG ID from the WTRU subscription corresponds to or matches any of CAG ID(s) (e.g., the selected CAG ID(s)) as forwarded by NG-RAN in an N2 message (e.g., operations 4 and 7 as shown in FIG. 2). On a condition that the AMF finds a matching CAG ID, the WTRU may be allowed to access the CAG cell, for example, a registration is accepted. In an example, the registration may be accepted via a Registration Accept message sent from the AMF to the WTRU. On a condition that the AMF does not find a matching CAG ID, the WTRU may not be allowed to access the CAG, for example, a registration is rejected. In an example, the registration may be rejected via a Registration Reject message sent from the AMF to the WTRU.

In various embodiments, SNPN(s) identification(s), cell selection(s) and/or access control may follow similar operations as for PLMN integrated NPNs as described above (e.g., procedures as illustrated in FIG. 2). An SNPN may be identified by a unique NPN ID. A Cell providing access to SNPN(s) may broadcast a set or a list of NPN IDs for these SNPNs as plaintext. The WTRU may select and attempt to register with one or more SNPNs when the WTRU finds subscriber identifier and/or credentials corresponding the set or list of broadcasted NPN IDs. For example, the WTRU may have a list/set of subscriber identifiers in the form of a Network Access Identifier (NAI) where the realm part may include the NPN ID. With regards to a PLMN integrated NPN, the WTRU may need to go through a full primary authentication before the network can determine whether the WTRU is allowed to access.

In various embodiments, the CAG cell access may be reserved exclusively for one or more WTRUs that support CAG. In an example, a cell discussed herein may be a regular PLMN cell or a CAG cell. In some cases, emergency services may be supported in a CAG cell.

In various embodiments, a PLMN integrated NPN may be referred to an NSA communications network, an NSA NPN, or a Public Network Integrated NPN, and these terms that refer to a PLMN integrated NPN may be interchangeable.
Representative Procedures for Security and/or Privacy for PLMN Integrated NPNs Access In various embodiments, security aspects for vertical services and/or PLMN integrated NPN access are discussed. For example, some aspects are related to potential (Distributed)Denial of Service ((D)DoS) attack in PLMN integrated NPNs that may be inflicted to a 5G system when a large number of malicious WTRUs attempt to register with the network (e.g., a CAG cell), and one or more of the number of WTRUs may not be allowed to access the network (e.g., the CAG cell). A potential security requirement may be implemented to mitigate such (D)DoS attack on PLMN integrated NPN (which results from Registration requests from WTRUs that are not allowed to access the CAG cell).

In various embodiments, a WTRU may include a CAG ID as plaintext in an initial NAS Registration Request message. The AMF may send an authentication request, including the CAG ID provided by the WTRU, to the Home PLMN (HPLMN). Upon receiving the request, the UDM may determine or verify that the provided CAG ID matches a CAG ID from the WTRU subscription data. For example, the UDM may determine (or verify) whether the provided CAG ID matches a CAG ID from the WTRU subscription data after de-concealing the SUCI into a valid Subscription Permanent Identifier (SUPI). In an example, if no match is found, the UDM may reject the authentication request, and the AMF may reject the WTRU Registration.
Representative Procedures Using Cryptographic Hash Function and Salt In various embodiments, for example, a cryptographic hash function (e.g., SHA-3, PBKDF2, BCRYPT) is referred to as a one-way function (infeasible to revert). A cryptographic salt, for example, may be referred to as random non-secret data used as an additional parameter by a hash function to defend against (e.g., pre-computed) dictionary attacks by randomizing (e.g., effectively randomizing) the output of the hash function. In various embodiments, a cryptographic hash function and/or a cryptographic salt may be used to protect passwords as randomized hash strings, for example, in storage or in transmission.

In an example, a user re-using the same password across different services may have different hashed passwords (e.g., in storage) at these services, assuming these services are using different random salts. In another example, two users using the same or common password in the context of the same service may have different hashed passwords (e.g., in storage), assuming the service is using a different random salt for each user.

Representative Procedures Using Diffie-Hellman Key Agreement

In various embodiments, a shared secret derived using any of Diffie-Hellman (DH), Elliptic-curve Diffie-Hellman (ECDH) and like-type protocols may be directly used as a session key, or as a master key to derive a session key. The session key may be used to encrypt, or integrity protect subsequent communications using a symmetric-key cipher.

The DH protocol provides for key exchanges that may be used to allow two parties (e.g., a WTRU and a gNB) that have no prior knowledge of each other to jointly establish the shared secret key over an insecure channel. The ECDH protocol, a variant of the DH protocol, uses elliptic-curve cryptography. ECDH is an anonymous key agreement protocol that allows two parties, each having an elliptic-curve public-private parameters pair, to establish the shared secret over an insecure channel.

Representative Procedures Using Elliptic-Curve Integrated Encryption Scheme (ECIES)

In various embodiments, an ECIES may be refer to an integrated encryption scheme that uses multiple cryptographic functions: a key agreement function, a key derivation function, a symmetric encryption mechanism/function, and/or a Message Authentication Code (MAC) function. ECIES combines a Key Encapsulation Mechanism with a Data Encapsulation Mechanism. A system using ECIES may independently derive an encryption key and a MAC key from a common secret. ECIES has been standardized, for example, in ANSI X9.63, IEEE 1363a, ISO/IEC 18033-2, and SECG SEC-1.

ECIES has been specified for 5G security architecture as a standard mechanism for SUPI privacy protection. Using ECIES, for example, a WTRU may be able to protect the confidentiality/integrity of an SUPI by using a derived symmetric encryption key and/or a MAC key, which are obtained by running a key derivation function following a key agreement function using a Home Network pre-provisioned public key and a generated ephemeral public/private key pair.

Representative Procedure for CAG Access Control for PLMN Integrated NPNs Access—(Distributed) Denial of Service ((D)DOS)

In various embodiments, a WTRU (e.g., an NPN WTRU) and a network that support CAG access control for PLMN integrated NPN access may mitigate or reduce the risks of (Distributed) Denial of Service ((D)DOS) attack(s) on a CAG cell, a network, a UDM, and/or a subscription identifier de-concealing function (SIDF).

Referring to FIG. 2, when the WTRU initially accesses a CAG cell, the network (e.g., the AMF) may check (or must check) the cell supported CAG ID(s) provided by the gNB (and/or selected by the WTRU) against the CAG ID list from the WTRU subscription information before allowing access. The WTRU may perform or must perform a full primary authentication run/check with the network. Such procedure may use or require the UDM/SIDF to de-conceal the SUCI first, so that the AMF can obtain the SUPI to retrieve CAG related subscription information. This privacy enhancement (e.g., privacy enhancement) can increase the processing load in the home network as the UDM/SIDF needs to perform public key operations (e.g., SUPI de-concealing at SIDF). AUSF may be referred to an Authentication Server Function, and a VPLMN may be referred to a Visited PLMN.

In an example, an attacker may attempt to flood the network with registration requests through one or more CAG cells, forcing the UDM/SIDF to process lots of bogus or fake SUCIs, while at the same time, consuming radio resources in the CAG cell(s), causing a (D)DOS attack on the network (e.g., the UDM/SIDF). In another example, a set of legitimate or real WTRUs may create a storm of registration requests while being not allowed to join a CAG cell (e.g., a particular CAG-enabled cell). Similar (D)DoS attack risks may be encountered in the case of SNPN(s) where a large number of WTRUs that are not allowed to access an SNPN cell may attempt to register with the SNPN cell.

In various embodiments, with regards to (D)DOS mitigation or reduction, during the identification phase, the WTRU and/or the network may reduce the window of opportunity for a (D)DOS attack by verifying the validity of the CAG ID before the primary authentication takes place (e.g., during identifying or verifying the WTRU identity by the UDM). The threat of potential (D)DOS attacks on the UDM may be addressed, since the UDM may be required to or may de-conceal the SUCI. The processing load of the UDM may be increased, for example, compared to the procedure in FIG. 2, since the UDM can perform or must perform the CAG ID verification as part of the identification procedure.

In some implementations, the cell supported CAG ID(s) that are expected to come from the gNB may not be included in an authentication message (e.g., an authentication message sent by the AMF to the UDM). In an example, the UDM may check (e.g., only check) that the WTRU provided CAG ID is part of the WTRU subscription, and may not check whether the WTRU is allowed to access the CAG Cell. In some cases, a WTRU (that supports CAG) may be allowed to access any CAG cell, breaking the access control envisioned by the procedure in FIG. 2.

Representative Procedures for CAG Access Control for PLMN Integrated NPNs Access—Privacy of the NPN and/or WTRUs In various embodiments, a WTRU (e.g., an NPN WTRU or UE) and a network that support CAG access control for PLMN integrated NPN access may preserve privacy of the NPN being served by the CAG cell and/or the privacy of the NPN WTRUs allowed to access the CAG cell(s).

In various embodiments, Network Slice Selection Assistance Information (NSSAI), or a set of Single NSSAIs (S-NSSAIs), may be considered as private information (e.g., in 5G NR). Enhancements may be implemented, for example, to enable the protection of the NSSAI in the Access Stratum (AS) (e.g., the RRC) layer and/or the NAS layer during the initial Registration procedure. In an example, a CAG ID being assigned to a network slice dedicated to a particular NPN may not only reveal information related to a particular S-NSSAI, but may also reveal the information to the particular enterprise for which the CAG cell and/or network slice is or was allocated. For example, a CAG ID may be considered as private information.

In various embodiments (e.g., the procedure in FIG. 2), the privacy of the NPN and/or WTRUs is implemented. In an example, a CAG Cell may broadcast a set and/or a list of supported CAG IDs (e.g., supporting a total of twelve CAG IDs). In some situations, broadcasting the set or list of supported CAG IDs may be a privacy risk. For example, an attacker may identify and/or map particular cell(s) serving a particular NPN based on the CAG ID(s), which are broadcasted in the clear. An attacker may use this information to target and/or disrupt the NPN's operations (e.g., using the (D)DOS attack discussed above). In the case of SNPN(s) where a set/list of one or more NPN IDs is broadcast in the clear by the cell providing access to these SNPN(s), similar privacy risks may be encountered.

In an example, an attacker may be able to track users of an NPN and/or NPN slice(s) by eavesdropping communication exchanges on certain cells. For example, by detecting that a particular WTRU is allowed to access a CAG cell (e.g., by eavesdropping on Registration Accept message(s)), the attacker may be able to link the user to one of the NPN or NPN slices served by the CAG cell and to link privacy-protected temporary identities of multiple WTRUs (e.g., SUCI(s)). In some cases, an attacker can track a user even more specifically since the WTRU may send a (e.g., selected) CAG ID in the clear in the initial Registration message, revealing precise information about the particular NPN slice the WTRU wants to access and providing to the attacker information for identity linking and/or traffic analysis attacks.

In another example, an attacker may acquire one or more cell-supported CAG IDs in plaintext from the broadcasted system information, and the attacker may request and obtain access to the cell by including one of the cell-supported CAG IDs in one or more RRC messages. In this case, conventional access control procedures performed by the network (e.g., a gNB), using a CAG ID transmitted by a WTRU, may be ineffective against attacks. The conventional access control procedures, for example, present a vulnerability that may be exploited by the attacker to conduct an attack, e.g., a (D)DOS attack as described above.

Representative Procedures for WTRU Configuration when Moving into a New CAG Cell In some examples, the WTRU configuration (e.g., Allowed NSSAI) may be incorrect when moving into a new CAG cell. For example, when a WTRU accessing a PLMN Integrated NPN is served by a specific PLMN network slice, the WTRU may be in a CAG cell from where the WTRU is allowed to access that network slice. In this example, the WTRU's Allowed NSSAI configuration may contain that network slice when the WTRU moves into the corresponding CAG cell.

Figure 3:
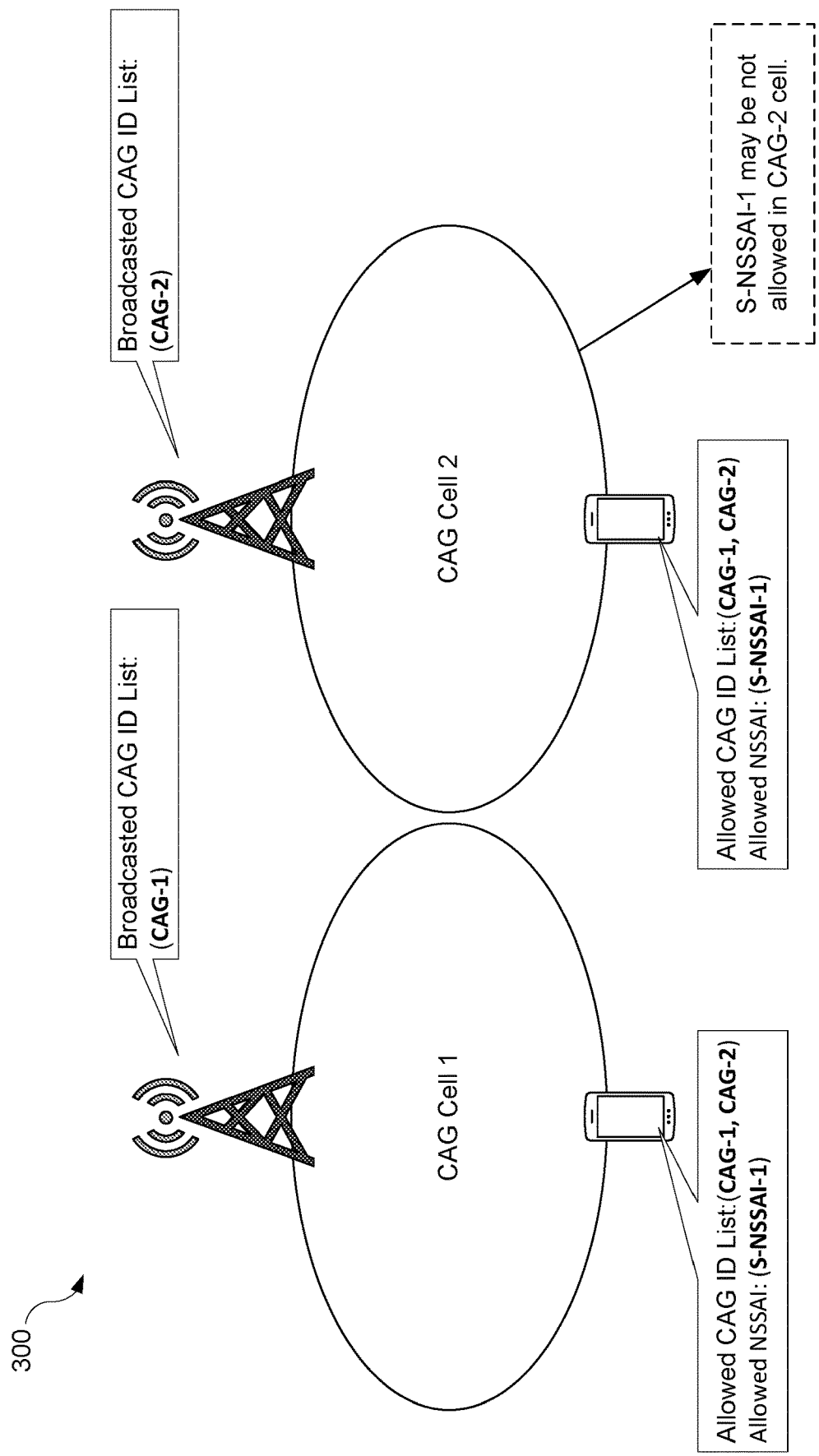
FIG. 3 is a diagram of an example of a WTRU moving between CAG cells that have different CAG identifiers (IDs), according to one or more embodiments.

In an example, the WTRU's allowed CAG list may contain multiple CAG IDs, and the WTRU may move between two CAG cells that have different CAG IDs, and both CAG cells may allow the WTRU to camp and/or access corresponding NPNs. Referring to FIG. 3, for example, as shown in a wireless communications network 300, a WTRU (e.g., WTRU 102) may have a configured allowed CAG list which may contain or include any number of CAG IDs (e.g., "CAG-1", "CAG-2"). The WTRU may move from a CAG cell of "CAG-1" to a CAG cell of "CAG-2". When the WTRU was in CAG-1 cell, the WTRU may have received an Allowed NSSAI configuration which had a S-NSSAI (e.g., S-NSSAI-1) that may have corresponded to CAG-1 and may not have had any S-NSSAI related to CAG-2. When the WTRU moves into the CAG-2 cell in a CM-IDLE state, the WTRU's Allowed NSSAI configuration may not be updated before the WTRU accesses the network. There may be a mismatch between the WTRU's Allowed NSSAI and the WTRU's CAG location.

In an example, if the user tries to initiate service (e.g., send a request) towards the NPN that is related to CAG-2, for example, triggering an establishment and/or a re-activation of PDU Sessions towards S-NSSAI-2 that serves the NPN, the WTRU may block the request, because the related S-NSSAI may not be in the current Allowed NSSAI con-figuration of the WTRU. In some cases, the WTRU may allow a PDU session establishment or re-activation towards the S-NSSAI-1, which may be related to the CAG-1 to be initiated in CAG-2, and the request may be rejected by the network because the WTRU's current location (e.g., CAG-2) does not allow the WTRU to access the S-NSSAI-1.

Representative Procedures for Synchronization of WTRU CAG ID Configuration(s) Following a CAG ID Subscription Update In some examples, when a WTRU is configured with a single Allowed CAG ID, a CAG ID mis-configuration issue may occur where the UE cannot access the network (or cannot access the network anymore). For example, the WTRU may be configured with a single Allowed CAG ID (CAG ID_A), and the WTRU may be configured with and/or receives an indication that the WTRU can only access the network through CAG cell(s). In some cases, when the WTRU has registered with the network, the AMF may receive updated subscription data for which the CAG ID_A is not present (e.g., CAG ID_A may have been replaced by CAG ID_B). In this case, the AMF may send a Registration Reject message with the appropriate cause, and the WTRU may remove CAG ID_A from its Allowed CAG ID list. As a consequence, the WTRU has no Allowed CAG ID in its Allowed CAG ID list, and the WTRU can only access the network through CAG cells, therefore the WTRU is not able to access the network.

Figure 4:
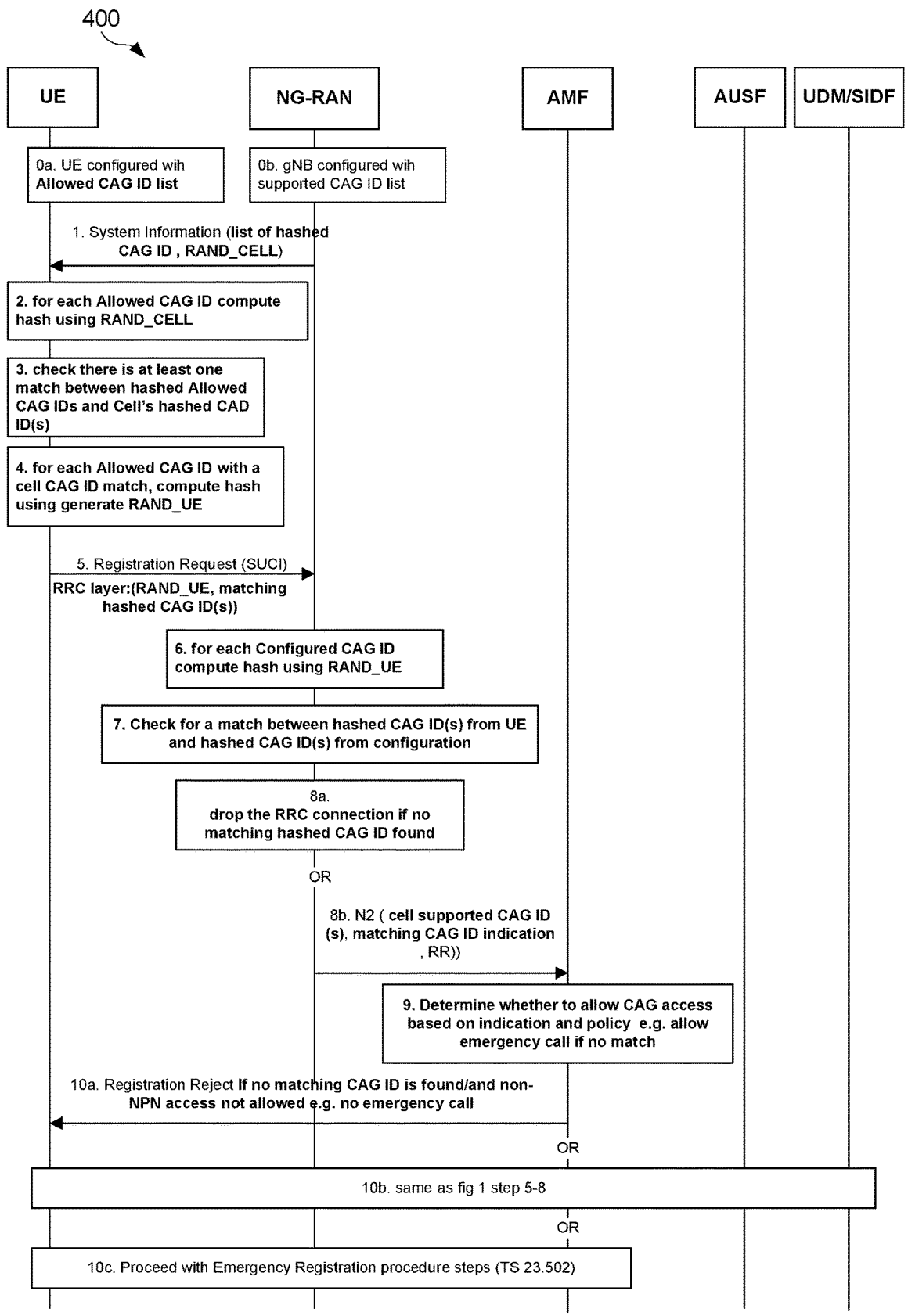
FIG. 4 is a signal flow diagram of an example of a registration procedure having radio resource control (RRC) based CAG access control, according to one or more embodiments.

Representative Procedures Using RRC Signaling to Mitigate (D)DoS Attacks on CAG Cell(s) and Network Referring to FIG. 4, a representative procedure 400 may be used to mitigate or reduce (D)DoS attacks on CAG cell(s) and/or one or more networks (e.g., the UDM/SIDF for PLMN integrated NPNs) using AS or RRC signaling. In various embodiments, a WTRU (e.g., WTRU 102) may compare hash values of its locally configured CAG ID(s) against hash values of CAG ID(s) broadcasted by the CAG cell, to find one or more matching CAG ID(s). The WTRU may register with the network and/or cell while providing fresh hash values of the one or more matching CAG ID(s) in the RRC layer. The WTRU may be allowed access to the CAG cell (and/or the NPN slice) if: i) at least one WTRU provided hashed CAG ID matches one or more hashed CAG ID(s) that is supported by the CAG cell, and/or the WTRU provided hashed CAG IDs are matched by (or to) one or more hashed CAG IDs that are supported by the CAG cell; or ii) according to a policy (e.g., emergency access using a default DN/Slice). In certain embodiments, the WTRU may be denied an access to the CAG cell (and/or the NPN slice). In an example, the procedure may include any of the following.

In various embodiments, e.g., in Operation 0, the WTRU may be configured with an Allowed CAG list from the HPLMN. The gNB may be configured with supported CAG ID(s). Such provisioning may be achieved out of band and/or at any time prior to Operation 1.

Operation 1. The WTRU may read from the CAG Cell broadcast system information (e.g., SIB1) one or multiple CAG Identifiers (IDs) that are individually hashed using a random number (e.g., a quasi-random number, pseudo-random number, RAND_CELL) as the base for a salt (e.g., SALT_CELL). The salt may, for example, combine RAND_CELL and the current Cell ID (e.g. SALT_CELL=RAND_CELL XOR Cell Id or RAND_CELL∥Cell Id) to bind the resulting hash value to the unique Cell Id. The Cell id may be included in broadcast system information. RAND_CELL may also be included in the broadcast information. Each CAG cell may use a different RAND_CELL/salt, such that two CAG cells supporting common CAG ID(s) (e.g., serving the same NPN(s) slices) may broadcast completely different hashed CAG ID(s). By randomizing the broadcast CAG ID(s) any two CAG cells may not be linked with one another by an eavesdropper based on hashed CAG ID information alone. Every time the configured supported CAG ID(s) are updated for a given CAG cell, a new RAND_CELL may be generated and used to produce new hash values for the new supported CAG ID(s) to be broadcast. It is to be understood that, for avoidance of repetition herein, the terms "pseudo-random number" may be used interchangeably with and/or in addition to the terms "quasi-random number".

Operation 2. The WTRU may compute a hash for each of the CAG ID(s) in its locally configured Allowed CAG list (e.g., refer to Operation 0) using SALT_CELL.

Operation 3. Prior to sending an Initial Registration request, the WTRU may compare the locally generated hashed CAG IDs with the hashed CAG IDs broadcasted by the CAG cell, and may determine whether there is at least one matching hashed CAG ID.

Operation 4. The WTRU may compute a new hash for each of the CAG ID(s) from the configured Allowed CAG matching the Cell broadcast hashed CAG IDs, using a newly generated random value (RAND_UE) as the base for a salt (SALT_UE). For example, the WTRU may include the Cell Radio Network Temporary Identifier (C-RNTI) assigned by the gNB in the RRC Setup message as part of the salt to bind the hashed CAG ID(s) to a particular RRC connection and transmission resources allocated by the gNB for the WTRU. The RAND_UE may add freshness to protect against a replay attack. The RAND_UE may be supplemented by including a timestamp parameter for the CAG ID(s) replay protection. Including the C-RNTI as a component of the WTRU salt may enable the gNB to detect a malicious WTRU attempting to replay a broadcast CAG Cell CAG IDs and cell salt (e.g., based on the difference of Cell and WTRU salt formats). In an example, RAND_UE may be bound to RAND_CELL (e.g., concatenation, XOR) and/or the Cell Id to build the salt (SALT_UE) such as the hashed CAG ID(s) transmitted by the WTRU may be bound to that particular cell that broadcasts the CAG IDs. This may enable the gNB to detect a malicious WTRU attempting to replay another WTRU hashed CAG ID(s) transmitted on a different cell.

Operation 5. The WTRU may send a Registration Request including the SALT_UE and the individually hashed CAG IDs matching the Cell broadcast CAG IDs in the Access Stratum (AS) layer (e.g., in the RRCSetupComplete message).

Operation 6. The gNB may compute a hash for each CAG ID in its Configured CAG ID list using the SALT_UE.

Operation 7. The gNB may check that there is a least one match between the WTRU provided hashed CAG ID(s) and the hashed CAG ID(s) computed (e.g., in Operation 6).

Operation 8. The gNB may decide (e.g., based on operator's policy and/or depending on local regulations) to:
  Operation 8a. drop the RRC connection immediately if no matching hashed CAG ID is found; or
  Operation 8b. if such matching hashed CAG ID(s) are found, send a message, e.g., over the N2 interface to the AMF, including a) the cell supported CAG ID(s), b) an indication whether the WTRU has at least one matching CAG ID with the CAG ID(s) of the cell, and c) the NAS Registration Request message from the WTRU.

The gNB may determine that a WTRU having no matching CAG ID (e.g., the WTRU does not provide any CAG ID) may be in a limited service state and/or may be trying to register for emergency services only. For example, the gNB may perform an "Emergency Registration" by setting the RRC establishment cause to emergency. Depending on local regulations and/or operator's policy, the gNB may decide to send the N2 message to the AMF for further access control checks.

Operation 9. Using the indication from the gNB and operator's policy, the AMF determines whether to allow WTRU to access the CAG cell or not.

Operation 10a. If the indication from the gNB states that no matching CAG ID are found and/or if non-NPN access is not allowed based on operator's policy/local regulations (e.g., registering for emergency services is not allowed on the CAG cell), the AMF may send a Registration Reject message to the WTRU (followed by the release of any AS or NAS connections); or Operation 10b. If the indication from the gNB states that at least one matching CAG ID was found, the network and the WTRU may proceed with the rest of the Registration procedure (e.g., as shown in FIG. 2, Operations 5-8); or Operation 10c. If the indication from the gNB indicates that no matching CAG ID is or was found and/or that non-NPN access is allowed based on operator's policy/local regulations (e.g., to allow WTRU to make an emergency call), the network and WTRU may proceed with an Emergency Registration procedure or an exception handling procedure per operator's policy/local regulations.

In various embodiments, a representative procedure (e.g., including one or more alternative call/signal flow operations compared to FIG. 4) may be used to mitigate or reduce (D)DoS attacks on CAG cell(s) and/or networks (e.g., UDM/SIDF for PLMN integrated NPNs) using AS or RRC signaling. This representative procedure may include any of the following:

Operations 0-1: The gNB may broadcast a random number (e.g., a quasi-random number, the RAND_CELL), the cell supported CAG IDs may be hashed using a RAND_CELL based salt. The gNB may broadcast another random number (e.g., the RAND_UE) to be used by a WTRU to hash its matching Allowed CAG ID(s) when attempting to access the network. The RAND_UE may be assigned a limited lifetime, short enough to reduce the possibility of a WTRU hashed CAG ID replay attack and long enough to allow legitimate RRC connections to complete (e.g., as a multiple of RRC connection timers, T300, and/or T352)

Operations 2-4: As discussed above in FIG. 4, the WTRU may select the CAG Cell based on a matching of a hashed CAG ID (e.g., using a RAND_CELL based salt). For example, the WTRU may compute hash values of its CAG ID(s) using a RAND_CELL based salt. The WTRU may check whether there is one or more matching hashed CAG IDs.

Operation 5: The WTRU may register with the network. In an example, the WTRU may compute the hash values of its matching CAG ID(s) from its Allowed CAG ID list using a RAND_UE based salt. The WTRU may build a salt by combining the RAND_UE with C-RNTI (e.g. salt=RAND_UE XOR C-RNTI). The WTRU may send the CAG ID(s) hashed using the RAND_UE based salt in a message (e.g., a RRCSetupComplete message). The WTRU may include the RAND_UE in the message. As discussed above in FIG. 4, the WTRU may combine the RAND_CELL and/or the Cell Id with RAND_UE/C-RNTI to build the salt, in order to enable a binding of the generated hashed CAG ID(s) with the WTRU and the Cell.

Operations 6-8a: The gNB may validate that the WTRU is allowed to access the CAG Cell based on a matching of the hashed CAG ID(s) (e.g., using the RAND_UE based salt). In an example, the gNB may check that the received RAND_UE is valid, if included in the RRC message. If the RAND_UE is not valid (e.g., is expired), the gNB may drop the RRC connection. If the RAND_UE is not included in the RRC message, the current broadcast RAND_UE may be used. In an example, the gNB may compute hash values of its configured CAG ID(s) using a RAND_UE based salt (e.g., RAND_UE XOR C-RNTI, and/or combined with RAND_CELL/Cell Id), and may check that there is a least one match with the WTRU provided hashed CAG ID(s).

Operations 8b-10 (which may include Operation 10a, 10b, or 10c): same as above procedure in FIG. 4.

Figure 5:
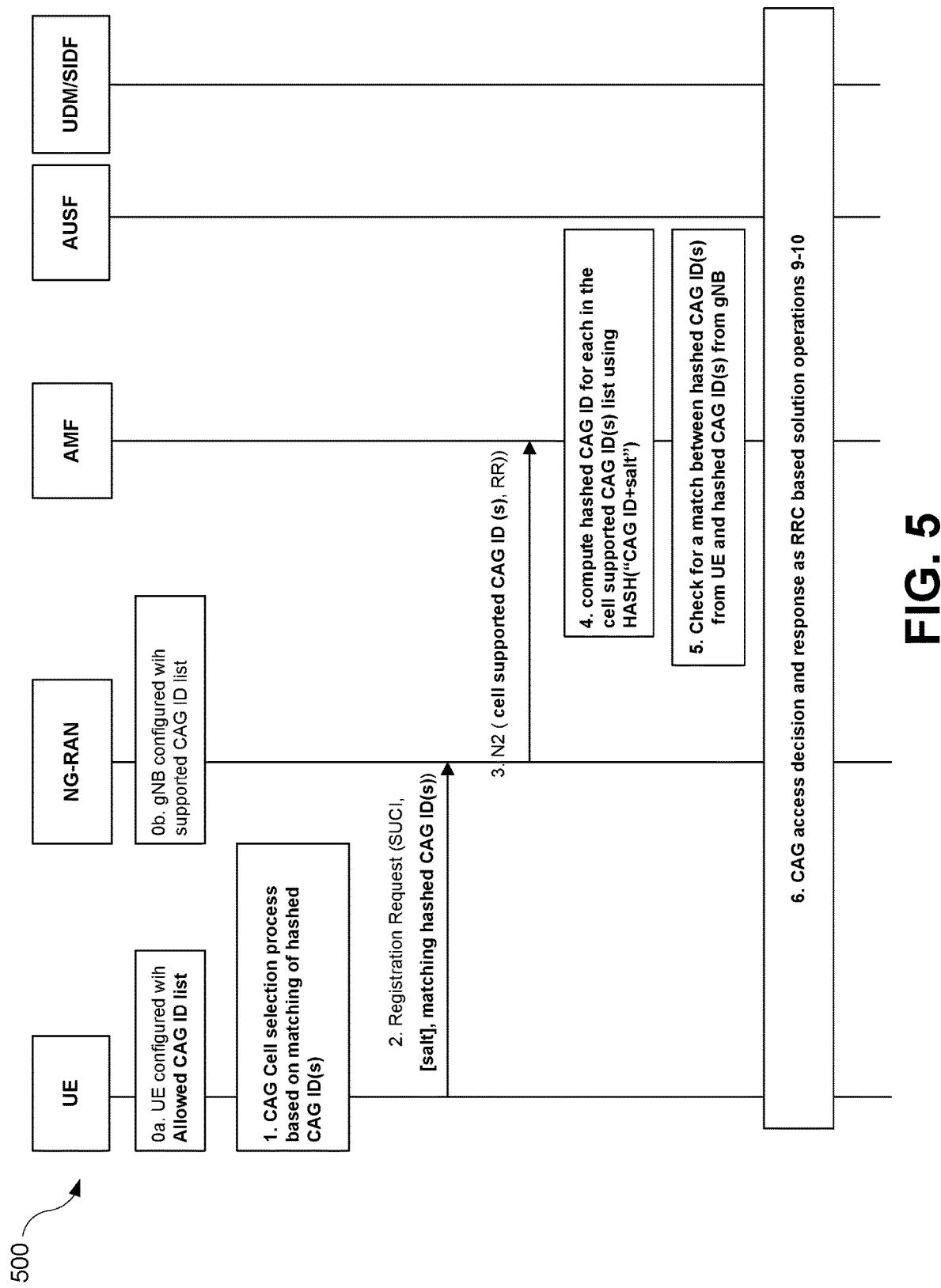
FIG. 5 is a signal flow diagram of an example of a registration procedure having non-access stratum (NAS) based CAG access control, according to one or more embodiments.

Representative Procedures Using Non-Access Stratum (NAS) Signaling, for Example to Mitigate (D)DOS Attacks on CAG Cells and/or Networks Referring to FIG. 5, a representative procedure 500 may be used, for example to mitigate or reduce (D)DoS attacks on CAG cell(s) and/or networks (e.g., the UDM/SIDF for PLMN integrated NPNs) using NAS signaling. In various embodiments, compared to the procedures using RRC layer signaling, the WTRU using this representative procedure may send and/or receive the hashed CAG ID(s) in a NAS layer, and the CAG ID(s) verification may be performed by, for example, a network entity (e.g., the AMF). In various embodiments, compared to the procedure in FIG. 2, the gNB may broadcast hashed CAG ID(s). This procedure may include any of the following:

Operation 0. The WTRU may be configured with an Allowed CAG list from the HPLMN. The gNB may be configured with a set and/or a list of supported CAG ID(s). This configuration or provisioning operation may be achieved out of band and/or at any time prior to Operation 1.

Operation 1. As described in FIG. 4 above, the gNB may broadcast hash values of the supported CAG IDs and one or more random numbers (e.g., quasi-random numbers, the RAND_CELL, and/or the RAND_UE). The WTRU may select the CAG Cell based on a matching of hashed CAG ID (e.g., using a RAND_CELL based salt).

Operation 2. The WTRU may register with the network. As described above, the WTRU may compute hash values of its matching CAG ID(s) using a RAND_UE based salt. The WTRU may send the CAG ID(s) hashed using the RAND_UE based salt in the NAS Registration Request message. The WTRU may include the salt in a NAS message (e.g., with a timestamp-based component for replay detection by the AMF).

Operation 3. The gNB may send a message over the N2 interface to the AMF, including i) the cell supported CAG ID(s), ii) the salt (e.g. a current RAND_UE XOR C-RNTI) used/needed to validate the WTRU provided hashed CAG IDs, and/or iii) the NAS Registration Request message from the WTRU.

Operation 4. The AMF may compute the hash values of the cell supported CAG ID(s) using a gNB provided salt (e.g., and/or using the WTRU provided salt).

Operation 5. The AMF may check that there is at least one match between the cell supported CAG ID(s) and the WTRU provided hashed CAG ID(s).

Operation 6. If a match is found, the AMF may proceed with a regular Registration procedure. If no match is found, the Registration may be rejected. In an example, if the Registration request is for emergency registration, the AMF may allow the WTRU to access to the network for emergency services, e.g., based on one or more operator policies and/or one or more local regulations.

Representative Procedures for Protecting Confidentiality of NPN and/or Privacy of NPN Users In various embodiments, to protect the CAG ID privacy, a mechanism, for example using one or more previously described procedures may be implemented. In various embodiments, the mechanism may be based on an exchange of randomized CAG IDs between or among the WTRU, the gNB, and/or the AMF (e.g., using hash functions with random salts). Privacy considerations may be dependent on local regulations. The network may be able to control whether randomized CAG ID-based access is active in a cell or not. A PLMN and/or NPN operator may provide an appropriate guidance (e.g., whether by provisioning or by other means) to the WTRU as to whether to allow a selection of a CAG Cell without CAG ID randomization enabled.

In various embodiments, the CAG cell may broadcast an indication that broadcast CAG ID(s) are randomized to inform a CAG supporting WTRU whether the cell supports randomized CAG ID based access. In certain embodiments, the presence of hashing random number(s) (e.g., a quasi-random number) as described above (e.g. RAND_CELL, RAND_UE) may inform a CAG supporting WTRU that the Cell has randomized CAG ID based access enabled.

In various embodiments, the CAG cell may broadcast randomized CAG ID(s) for cell selection and an indication whether the WTRU may send (matching) randomized CAG IDs for CAG Cell access control. If the indication instructs the WTRU to send hashed CAG ID(s) during the registration, the WTRU may perform a procedure (e.g., the procedures illustrated in FIG. 4 and/or FIG. 5) to register with the network. If the indication instructs the WTRU to not send hashed CAG ID(s) during the registration, the WTRU may perform a procedure (e.g., the procedure illustrated in FIG. 2) that may include randomized CAG ID(s) that may only be broadcasted for the cell (re)selection process and may not be transmitted (e.g., by the WTRU) for the access control operations.

In various embodiments, a CAG cell may broadcast a mix of randomized (e.g., with associated random number(s)) and non-randomized CAG IDs. In an example, a WTRU that supports CAG may be able to select a cell, after matching hashed CAG IDs, using the cell selection process or procedure(s) (e.g., procedure 400 illustrated in FIG. 4, or procedure 500 in FIG. 5), and/or matching plaintext CAG ID(s) as illustrated in FIG. 2. The WTRU may register with the network according to the procedure illustrated in FIG. 2 (e.g., without transmitting any CAG ID in the RRC or Registration message). In certain representative embodiments, the WTRU may register according the procedure 400 illustrated in FIG. 4 or procedure 500 in FIG. 5. In an example, the WTRU may transmit all the matching CAG ID as hash values for cases (e.g., procedures illustrated in FIG. 4 and/or FIG. 5) where the CAG IDs were broadcast as hash values or in plaintext.

In various embodiments, a WTRU (e.g., WTRU 102) that supports randomized CAG ID-based access may be configured with a CAG access "privacy mode" by the HPLMN, which may instruct the WTRU whether it is allowed to select a cell without randomized CAG ID based access enabled. A default value for this privacy mode may be configured to instruct (or indicate) the WTRU to select only cells with randomized CAG ID based access enabled. The WTRU may be configured by the serving PLMN/HPLMN after a successful Registration with a different mode (e.g., to allow selection of a cell with no CAG ID randomization). The CAG access privacy mode may be set on a per PLMN basis. A same or different privacy mode may be set on a per NPN basis (e.g., on a per CAG ID). If the privacy mode is set to "off," a WTRU may be allowed to select a CAG cell without randomized CAG ID based access enabled. For example, the procedure 200 illustrated in FIG. 2 may be performed to register to the network. If the privacy mode is set to "on," a WTRU may be allowed to select only CAG cells with randomized CAG ID based access enabled. One or more procedures (e.g., procedure 400 illustrated in FIG. 4, or procedure 500 in FIG. 5) may be performed to register to the network.

In various embodiments described above, privacy sensitivity of CAG ID may be linked to the privacy sensitivity of the NSSAI (e.g., by virtue of the CAG ID being associated with a particular S-NSSAI allocated for an NPN). In some examples, (Re)use of the Access Stratum Connection Establishment NSSAI Inclusion Mode may be implemented, for example, to enable the CAG access privacy mode while ensuring a consistent enforcement of network slicing privacy policies. In some cases, with NSSAI inclusion mode "a", the WTRU may include the NSSAI in the AS layer during AS connection establishment and in NSSAI inclusion mode "d", the WTRU may not include (e.g., never include) the NSSAI in the AS layer during AS connection establishment. For example, a CAG supporting WTRU may be allowed to select a CAG Cell with randomized CAG ID based access disabled when the NSSAI inclusion mode is set to mode "a", and may only select CAG Cells with randomized CAG ID based access enabled, when the NSSAI inclusion mode is set to mode "d".

The NSSAI sent during AS connection establishment (e.g., in the RRC layer) may be randomized using a hash-based operation (e.g., similar to the hash-based mechanism set forth herein for CAG ID(s)). For example, the WTRU may use a random number provided by a cell broadcast, as a base for a salt used to hash individually the requested S-NSSAIs sent during AS connection establishment (e.g., in the RRC layer). The gNB may be configured with S-NSSAIs for routing the Registration request from the WTRU to a proper AMF. The gNB may compute a hash of its configured S-NSSAIs to match the hashed S-NSSAIs sent by the WTRU. If a match is found, the gNB may forward the request to the designated serving AMF. If no match is found, the gNB may forward the request to a default AMF.

In various embodiments, the supported S-NSSAIs for a given Cell or given gNB may be broadcast randomized using a hash-based mechanism. The WTRU may use this information to assist in the cell selection process, or trigger a Registration update, to synchronize its Allowed NSSAI with the network, when the WTRU detects a change in the supported S-NSSAIs while moving (e.g., in a CM-IDLE state) to another cell (e.g., a connected S-NSSAI is not supported in the target Cell).

In various embodiments, a mechanism and/or procedure may be based on temporary S-NSSAI (T-S-NSSAI). For example, a WTRU (e.g., WTRU 102) may obtain one or more T-S-NSSAIs from the network (e.g., an AMF), for instance, in a Registration Accept message, during a Registration procedure. For example, the NG-RAN may obtain a list of T-S-NSSAIs supported by the PLMN from the AMF, e.g., in a NG Setup Response message during an NG Setup procedure. In one embodiment, the T-S-NSSAIs may be generated and/or maintained per PLMN (e.g., for a PLMN or for each respective PLMN). In another embodiment, the network may maintain one or more T-S-NSSAIs per WTRU and/or S-NSSAI (e.g., for a WTRU or for each respective WTRU, and/or for a S-NSSAI or for each respective S-NSSAI).

Figure 6:
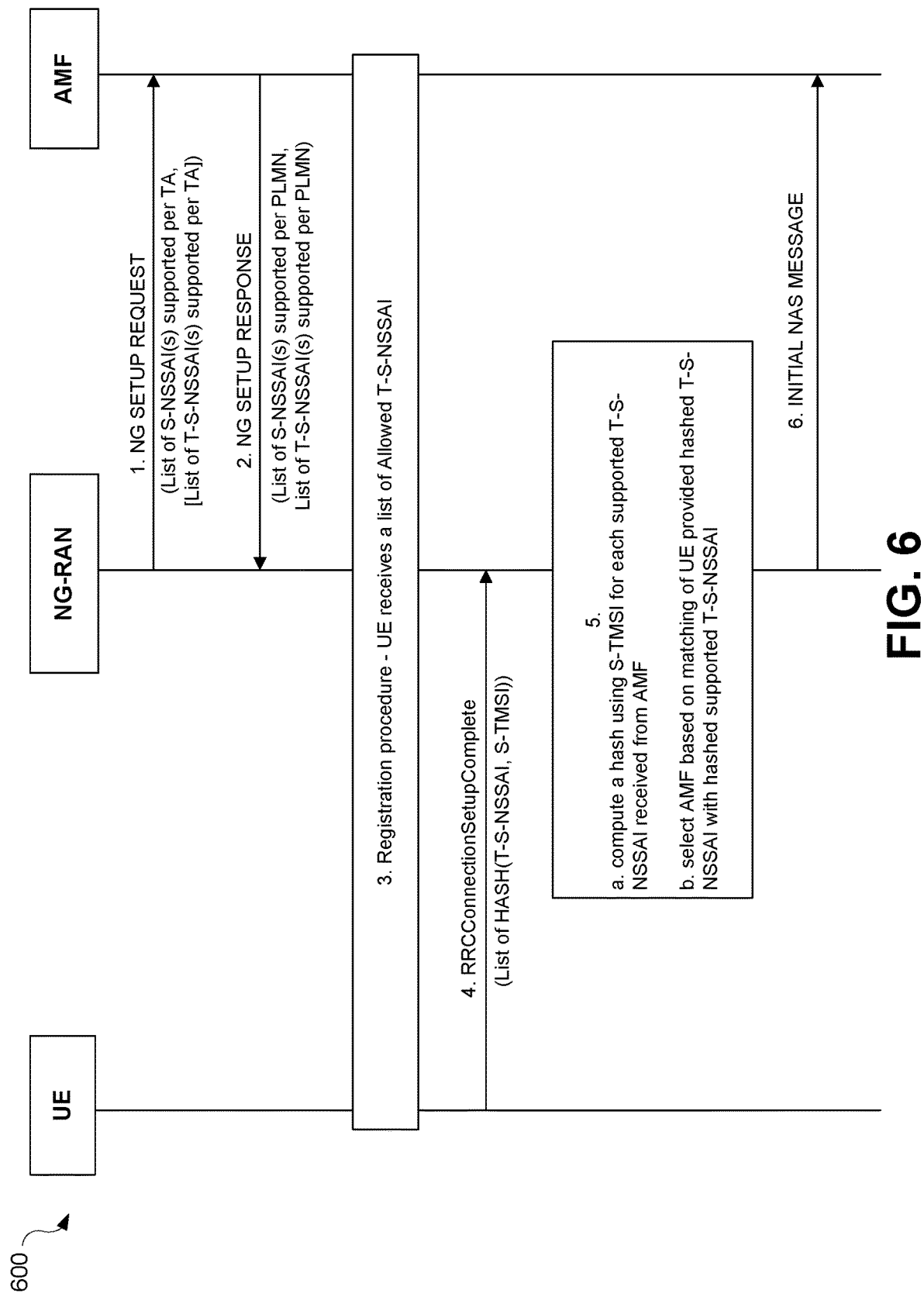
FIG. 6 is a signal flow diagram of an example of a procedure using hashed temporary S-NSSAIs (T-S-NSSAIs) during an access stratum (AS) connection establishment, according to one or more embodiments.

In various embodiments, the mechanism/procedure may work with one or more mechanisms/procedures discussed above, for example, when T-S-NSSAIs are assigned per WTRU and/or S-NSSAI, providing protection against WTRU linkability attacks. In an example, referring to FIG. 6, the WTRU may transmit one or more hash values of the requested T-S-NSSAIs (instead of cleartext T-S-NSSAI) in the AS layer during an AS connection establishment. The one or more T-S-NSSAIs hash values may be determined and/or computed using an S-TMSI, forcing the changes of T-S-NSSAI hashes every time the S-TMSI changes and mitigating WTRU linkability attacks. The NG-RAN may identify WTRU requested slice(s) by matching the hashed T-S-NSSAIs requested by the WTRU with the hash values of the T-S-NSSAIs provided by a core network (e.g., a 5G core (5GC)). This representative mechanism/procedure 600 may include any of the following:

Operations 1-2. The NG-RAN may obtain a list of supported T-S-NSSAIs from the AMF (e.g., a list of supported T-S-NSSAIs in addition to or in lieu of S-NSSAIs).

Operation 3. The WTRU may perform an initial Registration procedure with the network. For example, the WTRU may obtain a list of Allowed T-S-NSSAI(s), for example, in the Registration Accept message that may be protected by NAS security.

Operation 4. The WTRU may determine and/or compute the requested T-S-NSSAI hash values using its S-TMSI. The WTRU may transmit the T-S-NSSAI hash values in an RRC message (e.g., an RRCConnectionSetupComplete message). The WTRU may include an indication about the nature or type of the slice assistance information IE (e.g., a hashed T-S-NSSAI) to assist the NG-RAN in distinguishing between a first WTRU capable of NSSAI privacy protection and a second WTRU not capable of NSSAI privacy protection (e.g., such that the second WTRU may transmit the S-NSSAI as cleartext).

In various embodiments, the WTRU may automatically transmit fresh T-S-NSSAI hash values during an AS connection establishment after a new S-TMSI has been allocated as per or using one or more procedures discussed herein (or any existing procedures).

In various embodiments, by using an S-TMSI, two WTRUs requesting the same T-S-NSSAI may transmit different T-S-NSSAI hash values, for example, to mitigate WTRU linkability attacks that use identical T-S-NSSAI hash values. In some cases, the likelihood of a same S-TMSI being eventually re-allocated to a new WTRU requesting/using a same slice over time may be negligible for linkability attacks.

Operation 5. The NG-RAN may compute a hash using an S-TMSI for each of the supported T-S-NSSAI(s) received from the AMF. The NG-RAN may select an appropriate AMF based on a match of received T-S-NSSAIs and supported hashed T-S-NSSAIs.

Operation 6. The NG-RAN may route the WTRU initial NAS message to the selected AMF.

In various embodiments, the NG-RAN may receive at any time an AMF Configuration Update message including an updated list of T-S-NSSAIs (e.g., following an update of the list of S-NSSAIs supported by the PLMN). In an example, the network may maintain one set of T-S-NSSAIs per PLMN, e.g., with direct one-to-one mapping of an S-NSSAI and a T-S-NSSAI.

In various embodiments, it is understood that this randomization and security mechanism/procedure illustrated herein for CAG ID or NSSAI information elements (IEs) may be used for confidentiality, integrity, and replay protection of other IEs that should not be sent as cleartext (e.g., during initial connection establishment and/or in the absence of any existing security context).

Representative Procedures for Protecting Confidentiality of NPN and/or Privacy of NPN Users Using a Diffie-Hellman Based Key Agreement Protocol In various embodiments, mechanisms, methods, apparatus, and systems are disclosed to protect the confidentiality of one or more lists of CAG ID used in the NPN and/or the privacy of NPN users (e.g., a WTRU). In an example, a WTRU may be configured to perform one or more following operations.

For example, the WTRU may compare hash values of a set or list of locally configured Allowed CAG ID(s) of the WTRU against hash values of CAG ID(s) supported by a CAG cell (e.g., in a broadcast message and/or System Information broadcasted by the CAG cell, or a unicast message sent by the CAG cell) to find one or more matching CAG IDs. The WTRU may obtain from the received message, for example, a broadcast message including System Information that has keying parameters (e.g., a gNB ephemeral public key) to establish a shared secret with the RAN (e.g., CAG cell or the gNB). For example, the WTRU may obtain, identify, and/or decode the keying parameters (e.g., a gNB ephemeral public key) in the received System Information to establish a shared secret with the RAN (e.g., gNB) using a Diffie-Hellman based key agreement protocol. The WTRU may derive a secret key using exchanged keying parameters (e.g., one or more of: gNB ephemeral public key(s) and WTRU ephemeral public key(s)) and a WTRU or UE identity (e.g., a C-RNTI). The WTRU may register with the network (e.g., the CAG cell or the gNB) while providing in the RRC layer (e.g., the RRC part of a Registration message) the one or more matching CAG IDs protected for confidentiality and integrity, using the secret key (e.g., as in an Advanced Encryption Standard (AES) algorithm). In some cases, the rest of the registration procedure may be executed in a manner that is similar to the description in one or more embodiments discussed herein (e.g., procedures illustrated in FIG. 2, FIG. 4, and/or FIG. 5).

Figure 7:
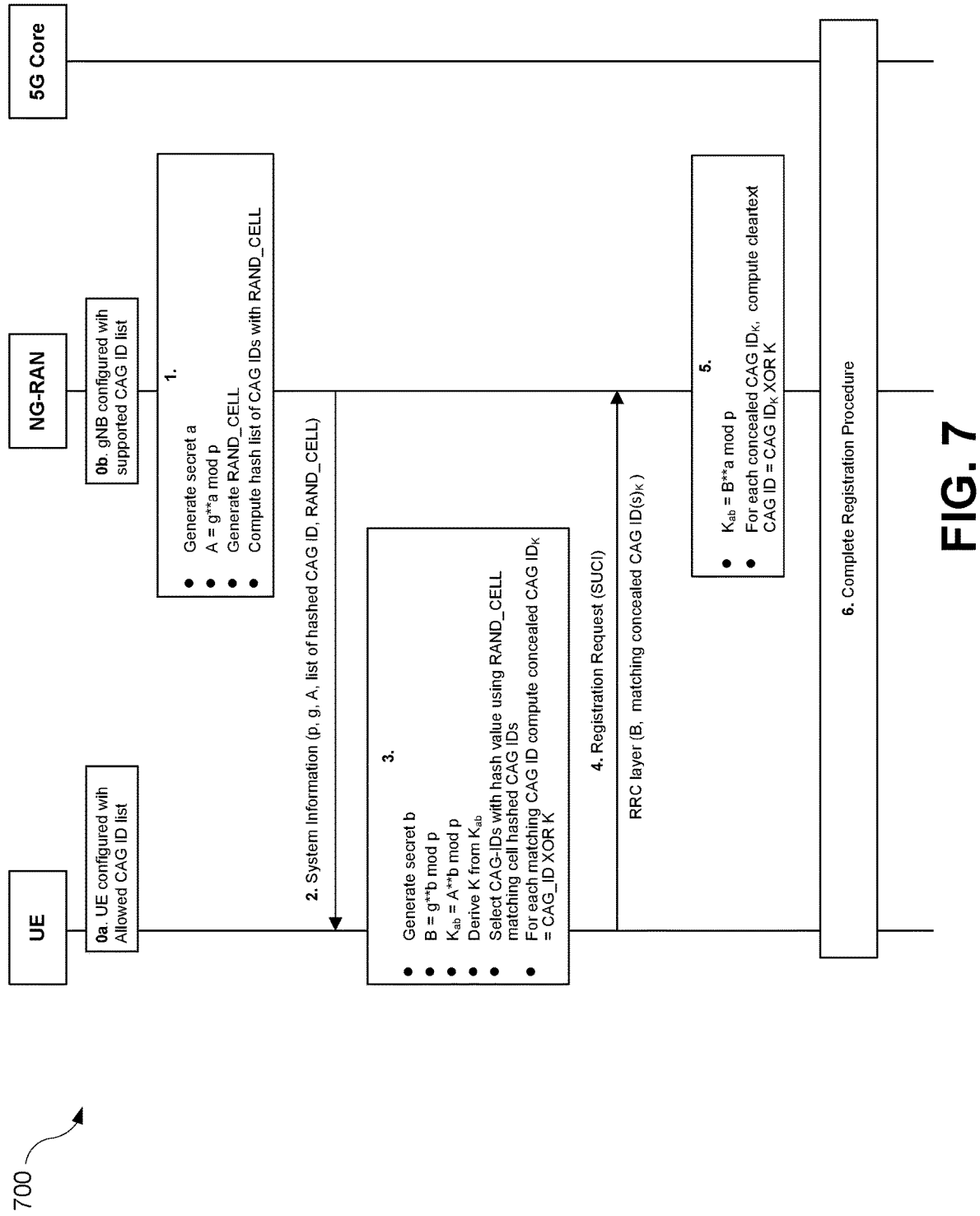
FIG. 7 is a signal flow diagram illustrating an example of a first CAG ID protection mechanism, according to one or more embodiments.

FIG. 7 is a signal flow diagram illustrating an example CAG ID protection mechanism 700 in connection with an example registration procedure. The CAG ID protection mechanism of FIG. 7 may use a Diffie-Helman based key agreement protocol. The CAG ID protection mechanism and/or the representative procedure may be used, for example, to address the confidentiality of one or more lists of CAG ID used in the NPN (e.g., a CAG cell or a gNB) and/or the privacy of NPN users (e.g., a WTRU). The CAG ID protection mechanism and/or representative procedure may include one or more of the following features (e.g., as shown in FIG. 7):

0. A WTRU may be configured with an Allowed CAG list from the HPLMN, and a gNB may be configured with a list of supported CAG ID(s).
1. The gNB may perform one or more of the following operations:
   For example, the gNB may generate an ephemeral private key a. The gNB may generate an ephemeral public key A using a (e.g., $A=g^a$ mod p, where g and p are prime numbers, where p may be a large prime number (e.g., 2048 bits, 3072 bits, or larger), and g is a generator (e.g., g=2). The gNB may generate a pseudo-random number (e.g., RAND_CELL). The gNB may compute a respective hash value for each of its configured CAG ID(s) using RAND_CELL.
2. The WTRU may obtain keying configuration parameters from System Information (e.g., SIB1). The keying configuration parameters may include any of p, g, A, RAND_CELL, and the list of hashed CAG ID(s).
3. The WTRU may perform one or more of the following operations (e.g., after obtaining the keying configuration parameters). For example, the WTRU may generate an ephemeral private key b. The WTRU may generate an ephemeral public key B using b (e.g., $B=g^b$ mod p). The WTRU may generate a shared secret $K_{ab}$ using A and b (e.g., $K_{ab}=A^b$ mod p). The WTRU may derive a secret key K from $K_{ab}$ (e.g., using A and B). The WTRU may select one or more CAG IDs from the list of Allowed CAG IDs whose hash value(s) (determined/computed using RAND_CELL) matches at least a hash value of a CAG ID from the gNB (configured or supported by the gNB). For each matching CAG ID, the WTRU may compute a concealed CAG ID using K (e.g., concealed $CAG\ ID_K$=CAG ID XOR K).
4. The WTRU may send a Registration Request message, and may include (e.g., in the RRC part of the message) any of the following parameters: B, and one or more concealed CAG ID(s)$_K$.
5. The gNB may perform one or more of the following operations. For example, the gNB may generate a shared secret $K_{ab}$ using B and a (e.g., $K_{ab}=B^a$ mod p). For the one or more concealed CAG(s)$_K$, the gNB may compute a cleartext CAG ID (e.g., cleartext CAG ID=concealed $CAG\ ID_K$ XOR K).
6. The complete registration procedure may be carried out in the same or analogous manner to like type procedures in one or more embodiments disclosed herein (e.g., procedures disclosed herein in connection with FIG. 2, FIG. 4, and/or FIG. 5). In various embodiments, the gNB may check whether the WTRU is allowed to access the CAG cell. The gNB, for example, may determine (whether or not) at least one cleartext CAG ID from the WTRU matches a configured CAG ID by the gNB. As an example, the gNB may determine that the WTRU is allowed to access the CAG cell if the gNB verified that at least one cleartext CAG ID from the WTRU matches a CAG ID configured/supported by the gNB.

Figure 8:
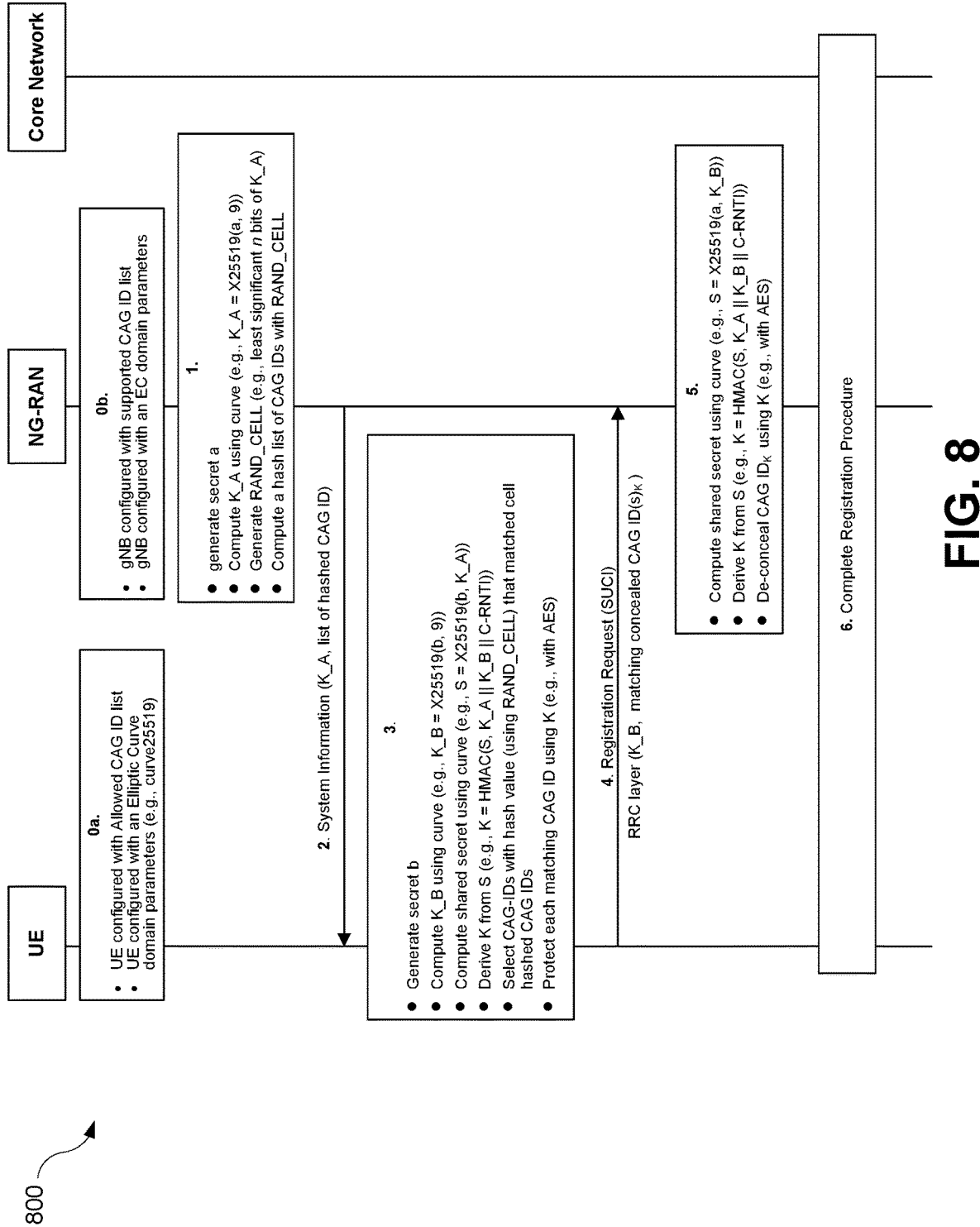
FIG. 8 is a signal flow diagram illustrating an example of a second CAG ID protection mechanism, according to one or more embodiments.

FIG. 8 is a signal flow diagram illustrating a CAG ID protection mechanism 800 in connection with an example registration procedure. The CAG ID protection mechanism 800 may use Elliptic-Curve Diffie-Hellman Ephemeral (ECDHE) based key agreement protocol. The CAG ID protection mechanism and/or the representative procedure may be used, for example, to address the confidentiality of one or more lists of CAG ID used in the NPN (e.g., a CAG cell or a gNB) and/or the privacy of NPN users (e.g., a WTRU). The CAG ID protection mechanism 800 may enable the protection of the CAG ID transmitted by the WTRU (or UE) in a manner that is analogous to the CAG ID protection mechanism 800 and/or representative procedure 700 in FIG. 7. In the CAG ID protection mechanism 800, an EC curve 25519 is used as an example, and other curves may be used as well.

This CAG ID protection mechanism 800 may include one or more of the following features (e.g., as shown in FIG. 8):

0. A WTRU may be configured with an Allowed CAG list from the HPLMN. A RAN (e.g., a gNB) may be configured with a list of supported CAG ID(s). In this example, the WTRU and the RAN/gNB may be configured with EC domain parameters (e.g., curve 25519).

1. The gNB may perform one or more the following operations. For example, the gNB may generate an ephemeral private key a (e.g., a 32-byte random number). The gNB may generate an ephemeral public key K_A using a (e.g., K_A=X25519(a, 9), where 9 is the curve base point). The gNB may generate a pseudo-random number (e.g., RAND_CELL=least significant n bits of K_A). The gNB may compute a respective hash value for each of its configured CAG ID(s) using RAND_CELL.

In various embodiments, by computing RAND_CELL as a function (e.g., truncation) of K_A, the hash value(s) of the configured CAG ID(s) may be bound to ephemeral public key K_A. This may enable the protection of the DH key agreement against an attack (e.g., a Man in the Middle (MiTM) attack) where the attacker tries to replace K_A (generated by the gNB) by its own key to establish a shared secret with the WTRU (e.g., in order to obtain the cleartext CAG ID(s)).

A new K_A may be generated periodically (e.g., frequently) in order to reduce the possibility of replay attacks on WTRU hashed CAG ID(s) (e.g., in RRC-SetupComplete messages). The gNB, for example, may include a nonce (e.g., a pseudo-random number) in the broadcast message that may change independently of K_A. For example, a new a and a new K_A may be used for a given time period (e.g., every few hours), whereas a new nonce may be generated and used: i.) independently from the K_A generation, and ii.) for a different time period (e.g., shorter time periods, every few minutes). As such, this process may provide additional freshness (e.g., based on policy) and may be used in order to save on K_A processing cost while providing protection against replay attacks using WTRU connection requests.

2. The WTRU may obtain keying configuration parameters from System Information (e.g., SIB1). The keying configuration parameters may include any of: K_A, and the list of hashed CAG IDs configured and/or supported by the gNB. The WTRU may obtain a nonce if the nonce is included in the (e.g., broadcasted) System Information (SI).

3. The WTRU may perform one or more of the following operations (e.g., after obtaining the keying configuration parameters). For example, the WTRU may generate an ephemeral private key b. The WTRU may generate an ephemeral public key B using b (e.g., K_B=X25519(b, 9)). The WTRU may generate a shared secret S using K_A and b (e.g., S=X25519(b, K_A)). The WTRU may derive a secret key K from S using a key derivation function, K_A, K_B, and/or a WTRU or UE identity (e.g., K=HMAC-SHA256(S, K_A||K_B||C-RTNI)). If a nonce is included in the broadcasted SI, the WTRU may use the nonce in the computation of K (e.g., by concatenation with one or more other parameters). The WTRU may select one or more CAG IDs from the list of Allowed CAG IDs whose hash value(s) (determined/computed using RAND_CELL) matches at least a hash value of a CAG ID from the gNB (configured or supported by the gNB), where RAND_CELL is obtained from K_A as described in Feature 1 and/or Feature 2. For each, some or all of the matched CAG IDs, the WTRU may compute a concealed CAG ID using K (e.g., concealed CAG ID$_K$=CAG ID encrypted/integrity protected using K and an AES algorithm).

4. The WTRU may send a Registration Request message, and may include (e.g., in the RRC part of the message) any of the following parameters: K_B, and one or more concealed CAG ID(s)$_K$. In an example, the WTRU may include a nonce received from the broadcast SI (e.g., for session synchronization between Feature 1, Feature 2, and/or Feature 4 discussed above, in cases when the Registration Request message may need to be synchronized with the broadcast message discussed above in Feature 1 and/or Feature 2).

5. The gNB may perform the following operations. For example, the gNB may generate a shared secret S using K_B and a (e.g., S=X25519(a, K_B)). For the one or more concealed CAG(s)$_K$, the gNB may compute a cleartext CAG ID (e.g., cleartext CAG ID=(check integrity protection) decrypts CAG ID$_K$ using K and an AES algorithm). The gNB may verify the freshness of the WTRU request(s) by validating that the included nonce corresponds to the current nonce in the broadcasted SI. The gNB may consider a WTRU request as valid using a previous nonce (e.g., based on policy). In some cases, using a previous nonce to check validity may avoid the gNB rejecting a WTRU that attempts to connect to the gNB using the previous nonce that has just been replaced with a new one in the broadcasted SI.

6. The complete registration procedure may be carried out in the same or analogous manner to like type procedures in one or more embodiments disclosed herein (e.g., procedures 200, 400, 500, and/or 700 disclosed herein in connection with FIG. 2, FIG. 4, FIG. 5, and/or FIG. 7).

Various embodiments disclosed herein illustrate mechanisms to protect CAG ID(s) during an RRC connection establishment procedure. It is contemplated that the protection mechanisms may also be used for confidentiality, integrity, and replay protection of other procedures and/or information elements (IEs) that may not be sent as cleartext, for example, during an initial connection establishment and/or in absence of any existing/valid security context.

In various embodiments, the WTRU may protect the NSSAI during AS connection establishment using the secret K as disclosed herein. The WTRU may apply a security protection to NSSAI during AS connection establishment based on the NSSAI inclusion mode parameter (as described above). As an example, when the NSSAI inclusion mode is "d", the WTRU may protect the transmitted NSSAI using the secret K. This protection mechanism may enable a gNB decrypting the NSSAI during AS connection establishment to forward the initial WTRU request to the designated serving AMF, instead of a default AMF, even when the WTRU is configured with NSSAI inclusion mode "d". In some implementations, when a WTRU operates with mode "d", a gNB may forward the WTRU request(s) to a default AMF, possibly leading subsequently to an additional AMF re-allocation procedure.

In various embodiments, other IEs, such as user data, may be transmitted with confidentiality, integrity, and replay protection using the mechanism(s) disclosed herein in cases where "cold start" data transmission is used together with over-the-air data protection (e.g., data transmission during initial registration and/or during AS connection establishment procedure(s)).

Among the types of IEs that may be protected using the protection mechanism disclosed herein are those used during AS connection establishment, including, for example, a WTRU or UE identity. Examples of the WTRU or UE identity (identifier) may include a System Architecture Evolution (SAE) Temporary Mobile Subscriber Identity (S-TMSI) and/or a 5G Globally Unique Temporary UE Identity (5G-GUTI). In an example, the confidentiality and replay protection of the protection mechanism disclosed herein may protect against an adversary who tries to establish an RRC connection spoofed using the target WTRU or UE identity (e.g., an S-TMSI) to cause a DoS attack on the target WTRU. In an attack scenario example, the target WTRU is in RRC_IDLE, while the target WTRU is considered as RRC_CONNECTED in the network or gNB following the malicious RRC Connection attempt(s). In such attack, the target WTRU may stop receiving paging message(s) as the target WTRU is considered as already connected to the network or the gNB.

Representative Procedures for Protecting Confidentiality of NPN and/or Privacy of NPN Users Using ECIES In various embodiments, a WTRU may use ECIES to protect one or more CAG ID(s) that are transmitted while establishing an AS connection.

In an example, the WTRU may obtain a RAN (e.g., a gNB) public key from the broadcasted SI. The WTRU may use the RAN public key and a generated ephemeral public/private key pair in ECIES to derive a symmetric encryption key and a Message Authentication Code (MAC) key. The WTRU may protect the one or more (e.g., selected) CAG ID(s) using one or more of these keys. In an example, the WTRU may transmit a WTRU-generated ephemeral public key, and/or the CAG ID ciphered and integrity protected (e.g., a CAG ID cipher-text with its MAC tag) during RRC Connection establishment (e.g., in a RRCSetupComplete message). After receiving the message containing the protected CAG ID, the RAN (e.g., gNB) may perform an ECIES key agreement function using a private key of the RAN and the WTRU provided ephemeral public key to derive the symmetric encryption key and the MAC key. Using these keys, the RAN may verify the CAG ID integrity and decrypt the CAG ID cipher-text.

It is contemplated that the RAN may support different types of CAG ID protection mechanisms to accommodate WTRUs with different capabilities or support the introduction of different protection mechanisms. The RAN may broadcast (e.g., as pre-defined codes) one or more supported key agreement and protection mechanisms (e.g., ECDH, ECIES, ciphering and/or integrity algorithms). The WTRU may select a protection method based on its security capabilities. The WTRU may communicate and/or provide the selected protection mechanism to the RAN along with the protected CAG ID information (e.g., as a specific code in the RRCSetup message). In various embodiments, a gNB supporting both ECDH (as described above) and ECIES mechanisms may be able to decide, based on the protected CAG ID information (e.g., a specific code) provided by the WTRU, whether the received ephemeral public key is to be used in an ECDH mechanism or an ECIES mechanism.

In various embodiments, a WTRU may obtain a RAN (e.g., gNB) public key after a successful Registration using a confidentiality, integrity and replay protected unicast message (e.g., an RRCReconfiguration message). The WTRU may use the RAN public key to protect the transmitted CAG ID during RRC Connection establishment (e.g., similarly to the procedure disclosed herein). The WTRU may store the RAN public key, and may re-use the RAN public key in subsequent RRC connection establishments (e.g., during Service Request, and/or Registration procedures). One or more CAG ID protection mechanisms (e.g., any of those employing key agreement, ciphering and/or integrity algorithms) supported by the WTRU may be transmitted as part of WTRU (or UE) security capabilities. The (e.g., selected) protection mechanisms may be negotiated between the WTRU and the RAN during an AS Security Mode Command (SMC) procedure or communicated by the RAN to the WTRU in a different message (e.g., an RRCReconfiguration message). In subsequent RRC connection establishment, if the WTRU has a RAN public key, the RAN may or may not provide a fresh or new public key (e.g., based on its security policy). In order to enable RAN public key revocation, it is contemplated that the RAN may transmit to the WTRU an identifier of the public key (e.g., a unique index). The WTRU may transmit the identifier of the public key (being used for CAG ID protection) during RRC Connection establishment (e.g., in an RRCSetupComplete message). The RAN may detect, based on the provided key identifier, that the public key used to protect the CAG ID is revoked and may decide to provide the WTRU with a new public key.

In various embodiments, upon detection of the key revocation condition or per serving network security policy, the WTRU may replace the previously stored public key with the new one (or remove the old key or the previously stored public key).

While one or more of the above embodiments may be used in a standalone manner, they may also be combined. For example, the WTRU may use a Diffie-Hellman based procedure/mechanism for initial registration and an ECIES-based procedure/mechanism for subsequent registrations.

Various embodiments disclosed herein provide CAG ID(s) protection during an RRC connection establishment procedure using ECIES. It is contemplated that these protection mechanisms may also be used for confidentiality, integrity, and replay protection of other procedures and/or IEs that may not be sent as cleartext, for example, during an initial connection establishment and/or in absence of any existing/valid security context.

Representative Procedures Using WTRU Configurations Related to CAG Cell Locations In various embodiments, the WTRU configuration (e.g., based on the allowed NSSAI, or related to a CAG cell location) may be incorrect when moving into a new CAG cell. When a WTRU (e.g., a WTRU that supports NPN) that is in a CM-IDLE state moves from one CAG cell to another CAG cell, the WTRU may compare the broadcasted CAG ID list in the new CAG cell with the CAG ID list broadcasted in the previous CAG cell. If the common and/or overlapped CAG ID(s) of the WTRU's Allowed CAG ID List and the broadcasted CAG ID List in the new cell is different from the CAG ID(s) of the WTRU's Allowed CAG ID List and the broadcasted CAG ID List in the previous cell, the WTRU may initiate a Registration and/or Service Request procedure with the network, for example to sync up its current CAG cell location with the network, and/or to receive proper configurations (e.g., Allowed NSSAI) for the new CAG cell. To make the comparison of the above-mentioned CAG IDs, the WTRU may store the CAG ID List of the previous cell and/or the common part of the CAG ID List of the previous cell.

In various embodiments, a WTRU may have an Allowed CAG ID List which may contain or include "CAG-1" and "CAG-2" and the WTRU may camp on a CAG cell which broadcasts a CAG ID List of "CAG-1" and "CAG-3". The common part of (e.g., overlap between) the WTRU's Allowed CAG ID List and broadcasted CAG ID List is "CAG-1". When the WTRU moves to a new CAG cell which broadcasts a CAG ID List of "CAG-2" and "CAG-4", the common part of the WTRU's Allowed CAG ID List and broadcasted CAG ID List may be changed to "CAG-2".

Upon determining/observing such a change (e.g., this change), the WTRU may initiate a Registration and/or Service Request procedure. During or after the Registration/Service Request procedure, the network may recognize that the WTRU's CAG location has changed, and the network may send related configurations (e.g., the Allowed NSSAI) to the WTRU during the same Registration or Service Request procedure, or the network may initiate another NAS procedure such as a UE Configuration Update (UCU) procedure to update the configurations.

In various embodiments, if the mobility between various CAG cells happens when the WTRU is in RRC_INACTIVE state, the WTRU may initiates an RRC Connection Resume procedure, when the WTRU observes that the common part of the CAG IDs has changed. In an RRC Resume Request message, the WTRU may indicate that the cause of the request is a "CAG cell change/update". The serving RAN may include the CAG ID List of the current cell in a N2 Path Switch Request message sent to the network, such that the network may recognize that the WTRU's CAG location has changed and may send the updated configurations to the WTRU. For example, the RAN Notification Area (RNA) configured for the WTRU in the RRC_INACTIVE mode may only contain or include the cells of the same CAG ID(s) such that the change of the CAG cell may automatically trigger tan RNA Update procedure which, for example may enable the network to update the configurations.

Figure 9:
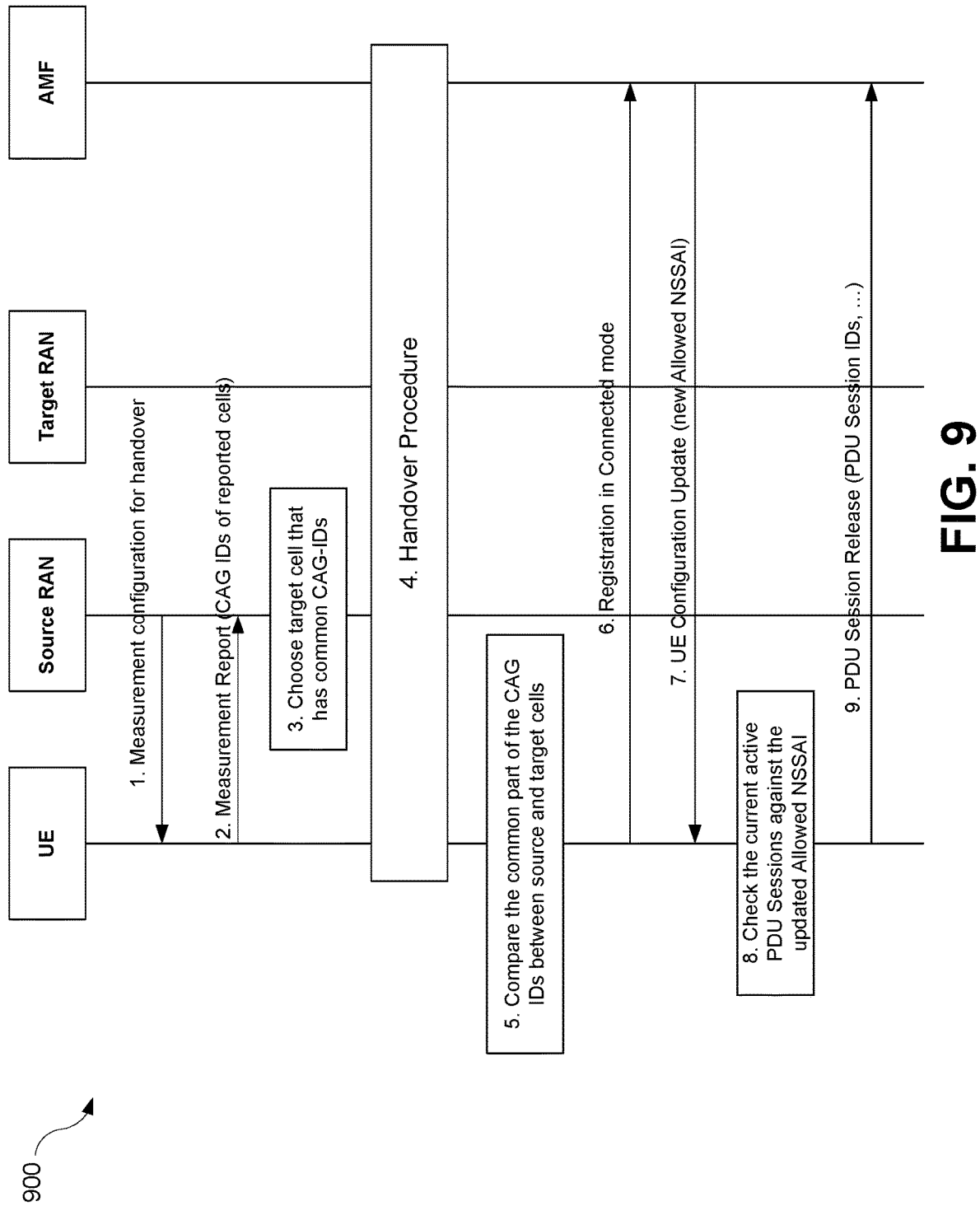
FIG. 9 is a signal flow diagram of an example of a handover procedure between CAG cells, according to one or more embodiments.

Referring to FIG. 9, a handover procedure 900 between CAG cells is provided. In various embodiments, with regards to a WTRU (e.g., WTRU 102) in CONNECTED mode, the WTRU may include the CAG IDs of the adjacent CAG cells in its measurement report, for example, as illustrated in the handover procedure 900. When a serving RAN (or serving cell/gNB) chooses the target cell for handover, the serving RAN (or serving cell/gNB) may consider the CAG cells that has at least one common CAG ID with itself.

In various embodiments, after the WTRU has completed the handover procedure, the WTRU may initiate a Registration procedure in Connected mode from the target cell, if the common part of the CAG IDs in the target cell has changed. The WTRU may receive a new configuration (e.g., an Allowed NSSAI) from the network. If the S-NSSAI(s) associated with the WTRU's currently active PDU Sessions are not in the updated Allowed NSSAI, the WTRU may initiate a PDU Session Release procedure for the PDU Sessions.

In the handover procedure 900, the WTRU reports CAG ID of the measured cells so the source RAN may take the CAG ID into consideration for choosing one or more handover target cells. The WTRU may trigger a Registration after the handover to receive updated configurations and check the active PDU Sessions against the updated NSSAI (e.g., Allowed NSSAI) and take proper actions (e.g., initiating PDU Session Release).

Representative Procedures for WTRU Allowed CAG ID Configuration Following a Subscription Update In various embodiments, a representative mechanism/procedure may be used to prevent the system or network from causing the exhaustion of an Allowed CAG ID list for a WTRU and subsequent barring of the WTRU from network access or further network access. For example, the mechanism/procedure may be implemented to prevent the WTRU from having an incorrect or out-of-date Allowed CAG ID configuration following a subscription update at the network (e.g., the AMF), while the WTRU may, for example, not be registered with the network. This representative mechanism/procedure may include any of the following operations.

For example, when the WTRU registers with the network, the WTRU may include its Allowed CAG ID list in the complete initial NAS message sent in an NAS SMC complete message. In another example, the WTRU may include a flag indicating that the WTRU Allowed CAG ID list contains or includes only one CAG ID or a number of CAG IDs. The CAG ID selected by the WTRU for accessing the cell may be provided or sent to the AMF by the NG-RAN via an N2 message (e.g., the N2 message as shown in FIG. 2). The WTRU may provide an indication that indicates whether the WTRU can only access the network through CAG cells.

In various embodiments, the AMF may detect, based on the Allowed CAG ID list received from the WTRU, that the subscription data is not synchronized. For example, the subscription may have been updated while the WTRU was not registered in the network. If the WTRU sends its Allowed CAG ID list to the AMF, then the AMF may identify (and/or determine) that the list is different from the one in the subscription data. If the WTRU does not send its Allowed CAG ID list to the AMF, then the AMF may identify (and/or determine) that the CAG ID received from NG-RAN is not part of the Allowed CAG ID list from the subscription data.

In various embodiments, the AMF may determine that the WTRU can only access the network through CAG cells. The AMF may use the corresponding indication (e.g., an indication value) provided by the WTRU, since the indication (e.g., an indication value) in the subscription (e.g., subscription data) may have been updated with the Allowed CAG ID list. The AMF may update the WTRU CAG configuration information (e.g., the Allowed CAG ID list and/or an optional indication indicating whether the WTRU is only allowed to access the network via CAG Cells). In an example, the AMF may send a new Allowed CAG ID list and/or provide a new (or updated) indication to indicate whether the WTRU can only access the network through CAG cells, by sending a message (e.g., a UE Configuration Update message) to the WTRU to update its configuration. In another example, the AMF may provide the new CAG configuration information in a protected Registration response (e.g., a Registration Reject message).

In various embodiments, the WTRU may update its Allowed CAG ID list (e.g., based on the update information and/or an indication received from the network discussed above). For example, the WTRU may remove obsolete CAG ID(s), and add one or more new CAG IDs. Following this CAG information configuration update, the WTRU may perform a new CAG Cell selection and/or network registration, for example, using its new (or updated) Allowed CAG ID list. In various embodiments, the WTRU may update its Allowed CAG ID list based on an existing WTRU configuration update (e.g., a UE Configuration Update) procedure and/or a new CAG configuration information provided to the WTRU (e.g., through any other protected message(s)).

In some examples, an adversary may attempt to cause a WTRU to empty its Allowed CAG ID list. For example, the adversary may send spoofed Registration Reject message(s) with an appropriate cause for a CAG ID rejection, causing the removal of one or more, or all CAG IDs. In various embodiments, in order to protect the WTRU against this type of attack(s), for example, the WTRU may remove one or more CAG IDs from its Allowed CAG ID list only if the Registration Reject message is at least integrity protected.

Representative Procedures for Secure Access Control Mechanisms

In various embodiments, methods and apparatus for secure access control in wireless communications, for example, secure access control mechanisms (e.g., for a NG-RAN) are provided. For example, a method (e.g., implemented in WTRU 102) for wireless communications may comprise receiving a broadcast message including system information, identifying a first set of hashed IDs and a first random number based on the system information, each ID of the first set of hashed IDs may be individually hashed using at least the first random number. The method may also comprise calculating a first hash value for each ID of a second set of IDs using at least the first random number, determining whether at least a hashed ID of the second set of IDs matches a hashed ID of the first set of hashed IDs, and sending/transmitting a request message based on a determination that at least a hashed ID of the second set of IDs matches a hashed ID of the first set of hashed IDs.

In various embodiments, the method may comprise calculating a second hash value, using at least a second random number, for at least an ID associated with a hashed ID of the second set of IDs that matches a hashed ID of the first set of hashed IDs, based on the determination that at least a hashed ID of the second set of IDs matches a hashed ID of the first set of IDs. In various embodiments, the second hash value is calculated using the second random number and a WTRU ID assigned by a network. In various embodiments, the WTRU ID assigned by the network is a Cell Radio Network Temporary Identifier (C-RNTI). In various embodiments, the request message is a radio resource control (RRC) message, and the RRC message may comprise information of the second random number, or at least the ID hashed by the second random number.

In various embodiments, when determining whether at least a hashed ID of the second set of IDs matches a hashed ID of the first set of hashed IDs, the method may comprise comparing each hashed ID of the second set of IDs with each hashed ID of the first set of hashed IDs.

In various embodiments, each ID of the first set of hashed IDs is individually hashed using the first random number and a cell ID. In various embodiments, the first set of hashed IDs comprises one or more hashed CAG IDs. In various embodiments, the second set of IDs comprises one or more pre-configured allowed CAG IDs.

In various embodiments, the method may comprise identifying a second random number based on the system information, and calculating a second hash value, using at least the second random number, for at least an ID associated with a hashed ID of the second set of IDs that matches a hashed ID of the first set of hashed IDs.

In various embodiments, the request message may be a registration request message, and the method may comprise receiving a registration response message including a set of allowed CAG IDs, and replacing a stored set of allowed CAG IDs with the set of allowed CAG IDs received in the registration response message. In various embodiments, the registration response message is a registration accept message or a registration reject message.

In various embodiments, on condition that no matching IDs are found by a network entity (e.g., a gNB), the method may comprise receiving a registration reject message after sending the registration request message. In various embodiments, on condition that at least one matching ID is found by the network, the method may comprise receiving a registration accept message after sending the registration request message. In various embodiments, the first hash for each ID of the second set of IDs may be calculated using the first random number and a cell ID.

In various embodiments, a method (e.g., implemented in WTRU 102) for wireless communications may comprise establishing a shared secret with a network entity based on one or more keying configuration parameters and a private key associated with a WTRU, deriving a secret key based on the shared secret and any of: the one or more keying configuration parameters, a public key associated with a WTRU, and an ID of the WTRU, generating a concealed ID, based on the secret key, for each hashed ID of a first set of hashed IDs associated with the WTRU that matches a hashed ID of a second set of hashed IDs associated with the network entity, and performing a registration procedure based on one or more concealed IDs generated by the WTRU.

In various embodiments, the method may comprise receiving a message (e.g., a broadcast message including system information, or a unicast message) from a network entity (e.g., a gNB), and identifying the one or more keying configuration parameters and the second set of hashed IDs based on the received message.

In various embodiments, when performing the registration procedure, the method may comprise transmitting the one or more concealed IDs generated by the WTRU.

In various embodiments, when establishing the shared secret with the network entity, the method may comprise generating the shared secret with the network entity using the one or more keying configuration parameters and the private key, and the one or more keying configuration parameters may comprise a public key associated with the network entity.

In various embodiments, the method may comprise generating the public key associated with the WTRU using the private key, and performing the registration procedure may comprise transmitting the one or more concealed IDs and the public key associated with the WTRU.

In various embodiments, the one or more keying configuration parameters may comprise any of: a public key associated with the network entity, and a random number associated with the network entity. In various embodiments, the random number may be bound to the public key associated with the network entity. In various embodiments, the random number may be determined based on a function of the public key associated with the network entity. In an example, the function comprises a truncation of the public key associated with the network entity.

In various embodiments, the ID of the WTRU (or the WTRU ID) is a Cell Radio Network Temporary Identifier (C-RNTI) or a specified RNTI assigned by the network (e.g., a NG-RAN).

In various embodiments, a set of hashed IDs may include one or more pre-configured allowed CAG IDs, or one or more subscriber IDs that comprise one or more NPN IDs.

In various embodiments, a set of hashed IDs may include one or more hashed CAG IDs supported by the network entity, or hashed NPN IDs.

In various embodiments, performing a registration procedure may comprise sending a Registration Request message including one or more concealed IDs.

In various embodiments, the method may identify a public key associated with the network entity from the one or more keying configuration parameters, and deriving the secret key comprises deriving any of a symmetric encryption key and a Message Authentication Code (MAC) key using the identified public key associated with the network entity.

In various embodiments, a set of hashed IDs may be a set of locally generated hashed CAG IDs or a set of locally stored hashed CAG IDs.

In various embodiments, generating one or more concealed IDs may comprise selecting at least a hashed ID of the second set of hashed IDs that matches a hashed ID of the first set of hashed IDs.

In various embodiments, the network entity may be any of: an AMF entity, a base station, a gNB, and a network node.

In various embodiments, the public key or the private key disclosed herein may be an ephemeral key.

In various embodiments, a method (e.g., implemented in WTRU 102) for wireless communications may comprise determining that a WTRU (e.g., WTRU 102) is in an IDLE mode, identifying a set of preconfigured IDs associated with the WTRU, identifying a first set of IDs associated with a first cell and a second set of IDs associated with a second cell, and initiating a registration procedure or a service request procedure, on condition that one or more preconfigured IDs that are common to the first set of IDs are different from one or more preconfigured IDs that are common to the second set of IDs.

In various embodiments, any of the first set of IDs or the second set of IDs may comprise one or more CAG IDs, or NPN IDs. The set of preconfigured IDs may comprise one or more pre-configured allowed CAG IDs, or one or more subscriber IDs that comprise one or more NPN IDs.

In various embodiments, a method (e.g., implemented in WTRU 102) for wireless communications may comprise determining that a WTRU (e.g., WTRU 102) is in an RRC INACTIVE mode, identifying a set of preconfigured identifiers (IDs) associated with the WTRU, identifying a first set of IDs associated with a first cell and a second set of IDs associated with a second cell, and initiating an RRC connection resume procedure, on condition that one or more preconfigured IDs that are common to the first set of IDs are different from one or more preconfigured IDs that are common to the second set of IDs.

In various embodiments, a method (e.g., implemented in WTRU 102) for wireless communications may comprise reporting a set of IDs of one or more measured cells to a first cell, initiating a registration procedure after handing over to a second cell, receiving an updated configuration including updated Allowed NSSAI, and determining whether to initiate a Protocol Data Unit (PDU) session release in accordance with whether one or more Single NSSAIs (S-NSSAIs) associated with one or more active PDU Sessions are in the updated Allowed NSSAI.

In various embodiments, the set of IDs may comprise one or more CAG IDs, or one or more subscriber IDs that comprise one or more NPN IDs.

In various embodiments, the CAG information may include a flag indicating that the stored Allowed CAG ID list includes only one CAG ID, a plurality of CAD IDs, or a number of CAG IDs.

In various embodiments, a method (e.g., implemented in WTRU 102) for wireless communications may comprise receiving a first message including a set of T-S-NSSAIs supported by a network (e.g., a gNB), and a WTRU ID assigned by the network during a registration procedure. After receiving the first message, the method may comprise computing one or more hash values for a set of requested T-S-NSSAIs using the WTRU ID assigned by the network and a random number, and sending a second message including at least the one or more hash values and the random number. In an example, the set of requested T-S-NSSAIs comprises one or more T-S-NSSAIs of the set of T-S-NSSAIs supported by the network.

In various embodiments, the first message may be a registration accept message. In various embodiments, the second message may be a radio resource control (RRC) message.

In various embodiments, an apparatus (e.g., WTRU 102) may comprise a receiver configured to receive a broadcast message including system information. The apparatus may also comprise a processor configured to identify a first set of hashed IDs and a first random number based on the system information, and each ID of the first set of hashed IDs may be individually hashed using at least the first random number. The apparatus may calculate a first hash value for each ID of a second set of IDs using at least the first random number, and determine whether at least a hashed ID of the second set of IDs matches a hashed ID of the first set of hashed IDs. The apparatus may also comprise a transceiver/transmitter configured to send a request message based on a determination that at least a hashed ID of the second set of IDs matches a hashed ID of the first set of hashed IDs.

In various embodiments, a WTRU (e.g., WTRU 102) may comprise a processor, a transceiver, and memory implementing any of the methods disclosed above.

Each of the following references are incorporated by reference herein: (1) 3GPP S2-1902898, "Introducing support for Non-Public Networks"; (2) 3GPP TS 23.122, "NAS functions related to MS in idle mode", V16.0.0; (3) 3GPP TR 33.819, "Study on security for 5GS enhanced support of Vertical and LAN Services"; (4) 3GPP S3-190994, "Key issue on CAG access control in Non-standalone NPNs"; (5) 3GPP TR 33.846," Study on authentication enhancements in the 5G System"; (6) 3GPP S3-190995, "New solution of CAG access control in Non-standalone NPNs"; (7) 3GPP TS 23.501, "System Architecture for the 5G System", V15.4.0; (8) 3GPP TS 23.502, "Procedures for the 5G System", V15.4.1; (9) 3GPP TS 33.501, "Security architecture and procedures for 5G system", v15.2.0; (10) 3GPP SA2 TR 23.734, "Study on enhancement of 5G System (5GS) for vertical and Local Area Network (LAN) services"; (11) 3GPP S2-1902810, "TS 23.502: Introducing Non-public network—CAG"; (12) Whitfield Diffie and Martin E. Hellman, "New directions in cryptography", IEEE Transactions on Information Theory, 22(6):644-654, 1976; (13) IETF RFC 7748, "Elliptic Curves for Security"; (14) 3GPP TR 33.813, "Study on Security Aspects of Enhanced Network Slicing", V0.4.0; and (15) 3GPP TS 38.300, "NR; NR and NG-RAN Overall Description", V15.4.0.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for wireless communications, performed by a wireless transmit/receive unit (WTRU) the method comprising:
sending, to a network entity, a first registration request via a first closed access group (CAG) cell, the first registration request indicating a capability for CAG;

receiving a registration reject message having new CAG identifier (CAG-ID) information;
selecting a second CAG cell based on the new CAG-ID information; and
sending, to the network entity, a second registration request via the selected second CAG cell.

2. The method of claim 1, further comprising updating stored CAG-ID information with the new CAG-ID information.

3. The method of claim 2, wherein updating comprises removing the stored CAG-ID information and adding the new CAG-ID information.

4. The method of claim 2, wherein updating the stored CAG-ID information with the new CAG-ID information is performed on condition that the received registration reject message is integrity protected.

5. The method of claim 1, wherein receiving a registration reject message having new CAG-ID information comprises receiving the registration reject message as integrity protected.

6. The method of claim 1, wherein receiving a registration reject message having new CAG-ID information comprises receiving new CAG-ID information from an access and mobility management function.

7. The method of claim 1, further comprising, before the sending of the first registration request:
identifying a first set of hashed identifiers, IDs, and a first random number based on received system information, wherein each ID of the first set of hashed IDs is individually hashed using at least the first random number;
calculating a first hash value for each ID of a second set of IDs using at least the first random number; and
determining whether at least a hashed ID of the second set of IDs matches a hashed ID of the first set of hashed IDs.

8. The method of claim 7, further comprising:
calculating a second hash value, using at least a second random number, for at least an ID associated with a hashed ID of the second set of IDs that matches a hashed ID of the first set of hashed IDs, based on the determination that at least a hashed ID of the second set of IDs matches a hashed ID of the first set of IDs, wherein the first registration request is a message comprising any of: information of the second random number, and the ID hashed by the second random number.

9. The method of claim 8, wherein the second hash value is calculated using the second random number and a wireless transmit/receive unit, WTRU, ID assigned by a network.

10. The method of claim 7, wherein the first set of hashed IDs comprises one or more hashed CAG-IDs and wherein the second set of IDs comprises one or more pre-configured allowed CAG-IDs.

11. A wireless transmit/receive unit (WTRU) comprising circuitry, including a transmitter, a receiver, a processor, and memory, the WTRU configured to:
send, to a network entity, a first registration request via a first closed access group (CAG) cell, wherein the first registration request indicates a capability for CAG;
receive a registration reject message having new CAG identifier (CAG-ID) information;
select a second CAG cell based on the new CAG-ID information; and
send, to the network entity, a second registration request via the selected CAG cell.

12. The WTRU of claim 11, wherein the WTRU is further configured to update stored CAG-ID information with the new CAG-ID information.

13. The WTRU of claim 12, wherein the WTRU update of the stored CAG-ID information comprises removing the stored CAG-ID information and adding the new CAG-ID information.

14. The WTRU of claim 12, wherein the WTRU update of the stored CAG-ID information is performed on condition that the received registration message is integrity protected.

15. The WTRU of claim 11, wherein the WTRU is configured to receive an integrity protected registration reject message.

16. The WTRU of claim 11, wherein the WTRU is configured to receive the registration reject message from an access and mobility management function.

17. The WTRU of claim 11, wherein the WTRU is further configured, before the sending of the first registration request, to:
identify a first set of hashed identifiers, IDs, and a first random number based on received system information, wherein each ID of the first set of hashed IDs is individually hashed using at least the first random number;
calculate a first hash value for each ID of a second set of IDs using at least the first random number;
determine whether at least a hashed ID of the second set of IDs matches a hashed ID of the first set of hashed IDs; and
calculate a second hash value, using at least a second random number, for at least an ID associated with a hashed ID of the second set of IDs that matches a hashed ID of the first set of hashed IDs, based on the determination that at least a hashed ID of the second set of IDs matches a hashed ID of the first set of IDs, wherein the first registration request is a message comprising any of: information of the second random number, and the ID hashed by the second random number.

18. The WTRU of claim 17, wherein the second hash value is calculated using the second random number and a wireless transmit/receive unit, WTRU, ID assigned by a network.

19. The WTRU of claim 17, wherein the first set of hashed IDs comprises one or more hashed CAG-IDs and wherein the second set of IDs comprises one or more pre-configured allowed CAG-IDs.

20. A non-transient computer-readable storage device having instructions thereon, which when executed by a computer, performs a method comprising:
sending, to a network entity, a first registration request via a first closed access group (CAG) cell, the first registration request indicating a capability for CAG;
receiving a registration reject message having new CAG identifier (CAG-ID) information;
selecting a second CAG cell based on the new CAG-ID information; and
sending, to the network entity, a second registration request via the selected second CAG cell.

* * * * *